United States Patent
Komatsu et al.

(10) Patent No.: US 8,045,255 B2
(45) Date of Patent: Oct. 25, 2011

(54) PROCESS FOR PRODUCING MICROCAPSULES FOR ELECTROPHORETIC DISPLAY DEVICES, AS WELL AS MICROCAPSULES FOR ELECTROPHORETIC DISPLAY DEVICES, OBTAINED BY THIS PROCESS, AND THEIR APPLICATIONS

(75) Inventors: Harunobu Komatsu, Matsumoto (JP); Shinji Takasaki, Suita (JP); Hironobu Hashimoto, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/644,694

(22) Filed: Dec. 22, 2009

(65) Prior Publication Data

US 2010/0165447 A1 Jul. 1, 2010

(30) Foreign Application Priority Data

Dec. 26, 2008 (JP) .................. 2008-334227

(51) Int. Cl.
*G02B 25/00* (2006.01)

(52) U.S. Cl. .................. 359/296; 359/290; 359/291

(58) Field of Classification Search .................. 359/290, 359/291, 296; 430/32; 345/107
See application file for complete search history.

(56) References Cited

U.S. PATENT DOCUMENTS

| 2005/0179983 A1* | 8/2005 | Sakai et al. ............. 359/296 |
| 2009/0147347 A1* | 6/2009 | Nishimura et al. ....... 359/296 |

FOREIGN PATENT DOCUMENTS

| JP | 50-15115 | 6/1975 |
| JP | 2551783 | 8/1996 |
| JP | 8-332407 | 12/1996 |
| JP | 2002-526812 | 8/2002 |
| JP | 2005-205396 | 8/2005 |
| JP | 2008-165191 | 7/2008 |
| WO | 00/20922 | 4/2000 |

* cited by examiner

*Primary Examiner* — Ricky Mack
*Assistant Examiner* — Mahidere Sahle
(74) *Attorney, Agent, or Firm* — Wenderoth, Lind & Ponack, L.L.P.

(57) ABSTRACT

There is disclosed a process for producing microcapsules for electrophoretic display devices, including classifying microcapsules for electrophoretic display devices from a dispersion containing microcapsules in an aqueous medium, using a specific particle classification apparatus of the particle settling type. The resultant microcapsules for electrophoretic display devices are used, as their applications, for sheets for electrophoretic display devices, electrophoretic display devices, and electronic equipments.

8 Claims, 8 Drawing Sheets

PROCESS FOR PRODUCING MICROCAPSULES FOR ELECTROPHORETIC DISPLAY DEVICES, AS WELL AS MICROCAPSULES FOR ELECTROPHORETIC DISPLAY DEVICES, OBTAINED BY THIS PROCESS, AND THEIR APPLICATIONS

BACKGROUND OF THE INVENTION

1. Field of the Invention

The present invention relates to a process for producing microcapsules for electrophoretic display devices, as well as microcapsules for electrophoretic display devices obtained by this process, and their applications.

2. Description of the Related Art

An electrophoretic display device displays character data, image data, and the like, by the behavior of electrophoretic particles, for example, when a voltage is applied to a dispersion in which the electrophoretic particles are dispersed in a solvent. For example, if the electrophoretic particles and the solvent are colored with different colors, the color of the electrophoretic particles is observed when the electrophoretic particles are moved to the surface of the solvent by voltage application, and the color of the dispersion is observed when the electrophoretic particles are moved to the bottom of the solvent. If electrodes to which voltage application is made possible by address appointment are provided, different colors for the respective addresses can be displayed, and accordingly, arbitrary character data and image data can be displayed. Moreover, it is possible to rewrite the display data, and at the same time, it is advantageous that the display data can be maintained as it is, even if there is no electric signal.

In recent years, in place of the conventional electrophoretic display devices (e.g., see Japanese Patent Publication (Kokoku) No. Sho 50-15115) in which a dispersion of electrophoretic particles are enclosed in spaces between opposed electrode substrates, there have been developed microcapsule type electrophoretic display devices (e.g., see Japanese Patent No. 2551783) with a structure in which microcapsules enclosing a dispersion of electrophoretic particles are arranged between opposed electrode substrates. As compared with the conventional electrophoretic display devices, the microcapsule type electrophoretic display devices are remarkably improved in various performances and functions, such as long-term stability of display, responsiveness, contrast, and display rewritable times.

For the electrophoretic display devices, there have also been proposed, besides fixed equipments such as ordinary displays, techniques of flexible displays, which have the shape of a thin sheet, which are ultraportable, and which can freely be inflected, such as electronic papers and electronic books.

In such electrophoretic display devices, there has been proposed a technique of making a dispersion of electrophoretic particles, i.e., a dispersion for electrophoretic display devices, into microcapsules (see, e.g., Japanese Patent Laid-open Publication (Kohyo) No. 2002-526812). A flexible sheet-shaped electrophoretic display device can easily be produced by enclosing a dispersion for electrophoretic display devices in microsphere-shaped microcapsules made of a transparent resin or the like and allowing the thus obtained microcapsules for electrophoretic display devices to be supported on the surface of an electrode film. There occurs neither uneven local distribution nor movement of a dispersion for electrophoretic display devices by making the dispersion for electrophoretic display devices into microcapsules, resulting in a technique also suitable for various applications in which electronic equipments may variously change their positions or may be inflected when used, such as electronic papers.

The sheet-shaped electrophoretic display device having flexibility is produced by, for example, by applying a coating solution for electrophoretic display devices, which contains microcapsules for electrophoretic display devices and a binder resin, to a conductive layer of an electrode film to produce a sheet for electrophoretic display devices, having a data display layer on the conductive layer of the electrode film; and then attaching another electrode film to the data display layer. At that time, the microcapsules are arranged on the electrode film without leaving voids in the in-plane directions and without being layered in the thickness direction, so that high reflectance of white display, lower reflectance of black display, and consequently higher contrast can be obtained.

Thus, microcapsules for electrophoretic display devices are desired to have particle diameters as uniform as possible. However, microcapsules for electrophoretic display devices, which are produced by conventional techniques, show a certain broad particle size distribution of particle diameter. That is, there were able to be obtained only microcapsules for electrophoretic display devices, having a great coefficient of variation (CV value) of particle diameter. Therefore, in order to obtain microcapsules for electrophoretic display devices, having a small coefficient of variation (CV value) of particle diameter, for example, classification treatment using a sieve or a slit has been carried out (e.g., see Japanese Patent Laid-open Publication (Kohyo) No. 2002-526812).

However, in the classification treatment using a sieve or a slit, for example, relatively soft microcapsules such as microcapsules for electrophoretic display devices, each enclosing a dispersion containing electrophoretic particles and a solvent in a shell made of gelatin and gum arabic, may be deformed to become thin and long and may easily slip through the sieve or the slit, even if the microcapsules have particle diameters equal to or greater than the meshes of the sieve or the aperture of the slit, and therefore, it was not able to carry out classification with high precision. Further, since the microcapsules become condensed on the sieve or the slit, the microcapsules having smaller particle diameters may adhere to the microcapsules having greater particle diameters, and therefore, it was also not able to carry out classification with high precision. Moreover, since the microcapsules are rubbed on the sieve or the slit by vibration or pressure for a long time, the microcapsules may suffer from great physical damage, which has became a cause of lowering in their strength.

As methods other than classification treatment using a sieve or a slit, there may be mentioned a spontaneous settling method making use of gravity and a wet classification method making use of centrifugal force; however, the former requires a long time for treatment and is inferior both in productivity and yield, and the latter has a problem that microcapsules may be broken by a pump to be used for solution sending in the continuous treatment, and therefore, both methods are not suitable for classification on an industrial scale.

SUMMARY OF THE INVENTION

Under the above-described circumstances, it is an object of the present invention to provide a process for producing microcapsules for electrophoretic display devices, having a small coefficient of variation (CV value) of particle diameter, in a simple and easy manner at a high yield by classification treatment which can be carried out with high precision on an industrial scale without causing physical damages, not only for relatively hard microcapsules but also even for relatively soft microcapsules, as well as microcapsules for electrophoretic display devices, obtained using this process, and their applications (specifically, sheets for electrophoretic display devices, electrophoretic display devices, and electronic equipments).

The present inventors have made various studies, and as a result, they have found that when microcapsules for electrophoretic display devices are produced, it makes possible to produce microcapsules for electrophoretic display devices, having a small coefficient of variation (CV value) of particle diameter, in a simple and easy manner at a high yield, by classifying microcapsules for electrophoretic display devices from a dispersion containing the microcapsules for electrophoretic display devices in an aqueous medium, using a specific particle classification apparatus, i.e., a particle settling type particle classification apparatus comprising a connecting flow passage toward a dispersion reservoir, a conical part, a barrel part, and a discharging flow passage, in this order from a bottom side of the apparatus. This finding has now led to the completion of the present invention.

Thus, the present invention provides a process for producing microcapsules for electrophoretic display devices, comprising classifying microcapsules for electrophoretic display devices from a dispersion containing microcapsules in an aqueous medium, using:

a particle classification apparatus having a connecting flow passage toward a dispersion reservoir, a conical part, a barrel part, and a discharging flow passage, in this order from a bottom side of the apparatus, wherein particles are classified from the dispersion contained in the dispersion reservoir by generating a circulating flow of the dispersion in the barrel part until the dispersion reaches the discharging flow passage from the connecting flow passage, and wherein the connecting flow passage is composed of a dispersion feeding flow passage for introducing the dispersion into the conical part and a dispersion draining flow passage for returning the dispersion to the dispersion reservoir, at least a lower portion of the connecting flow passage being immersed from above the dispersion reservoir into the dispersion contained in the dispersion reservoir, and a classifying section composed of the conical part and the barrel part is located outside and above the dispersion reservoir.

In the production process as described above, the microcapsules for electrophoretic display devices, each having a particle diameter not smaller than a first particle diameter, may preferably be removed by classification using the particle classification apparatus, and then, with respect to the remaining microcapsules for electrophoretic display devices, the microcapsules for electrophoretic display devices, each having a particle diameter not greater than a second particle diameter which is smaller than the first particle diameter, may preferably be removed by classification using the particle classification apparatus; or the microcapsules for electrophoretic display devices, each having a particle diameter not greater than the second particle diameter, may preferably be removed by classification using the particle classification apparatus, and then, with respect to the remaining microcapsules for electrophoretic display devices, the microcapsules for electrophoretic display devices, each having a particle diameter not smaller than the first particle diameter which is greater than the second particle diameter, are removed by classification using the particle classification apparatus, thereby obtaining the microcapsules for electrophoretic display devices, having a small coefficient of variation (CV value) of particle diameter.

In this connection, the coefficient of variation (CV value) of particle diameter of the finally obtained microcapsules for electrophoretic display devices may preferably be not higher than 14%.

The present invention further provides microcapsules for electrophoretic display devices, which are obtained by the production process as described above.

The present invention further provides a sheet for electrophoretic display devices, comprising a layer containing the microcapsules for electrophoretic display devices as described above and a binder resin. In such a sheet for electrophoretic display devices, the layer containing the microcapsules for electrophoretic display devices and the binder resin may preferably be formed on an electrically conductive film.

The present invention further provides an electrophoretic display device comprising a data displaying part, wherein the data displaying part has the sheet for electrophoretic display devices as described above.

The present invention further provides an electronic equipment comprising a data displaying means, wherein the data displaying means has the electrophoretic display device as described above.

According to the present invention, the use of a specific particle classification apparatus makes it possible to carry out the classification of microcapsules for electrophoretic display devices with high precision on an industrial scale without causing their physical damages, not only for relatively hard microcapsules (e.g., microcapsules for electrophoretic display devices, each enclosing a dispersion containing electrophoretic particles and a solvent in a shell comprising an inner shell made of a mercapto group-containing amino resin and an outer shell made of an epoxy resin) but also even for relatively soft microcapsules for electrophoretic display devices which were not able to be classified with high precision by conventional techniques (e.g., microcapsules for electrophoretic display devices, each enclosing a dispersion containing electrophoretic particles and a solvent in a shell made of gelatin and gum arabic), and as a result, microcapsules for electrophoretic display devices, having a small coefficient of variation (CV value) of particle diameter, can be produced in a simple and easy manner at a high yield.

The obtained microcapsules for electrophoretic display devices can be used, as their application, for sheets for electrophoretic display devices, and can provide electrophoretic display devices and electronic equipments, both of which can exhibit excellent display performance, such as reflectance of white display and contrast, and both of which contain extremely few defective microcapsules.

The process for producing microcapsules for electrophoretic display devices according to the present invention makes it possible to produce microcapsules for electrophoretic display devices, having a small coefficient of variation (CV value) of particle diameter, in a simple and easy manner at a high yield.

The obtained microcapsules for electrophoretic display devices can be used, as their application, for sheets for electrophoretic display devices, and can be useful for the production of electrophoretic display devices and electronic equipments, both of which can exhibit excellent display performance.

Therefore, the process for producing microcapsules for electrophoretic display devices, as well as microcapsules for electrophoretic display devices, obtained by this process, and their applications, all of which are provided by the present invention, make a great contribution in various fields related to electronic equipments each having a data displaying means as a set of techniques for providing a data displaying means with extremely excellent display quality.

DETAILED DESCRIPTION OF THE PREFERRED EMBODIMENTS

Figure 1:
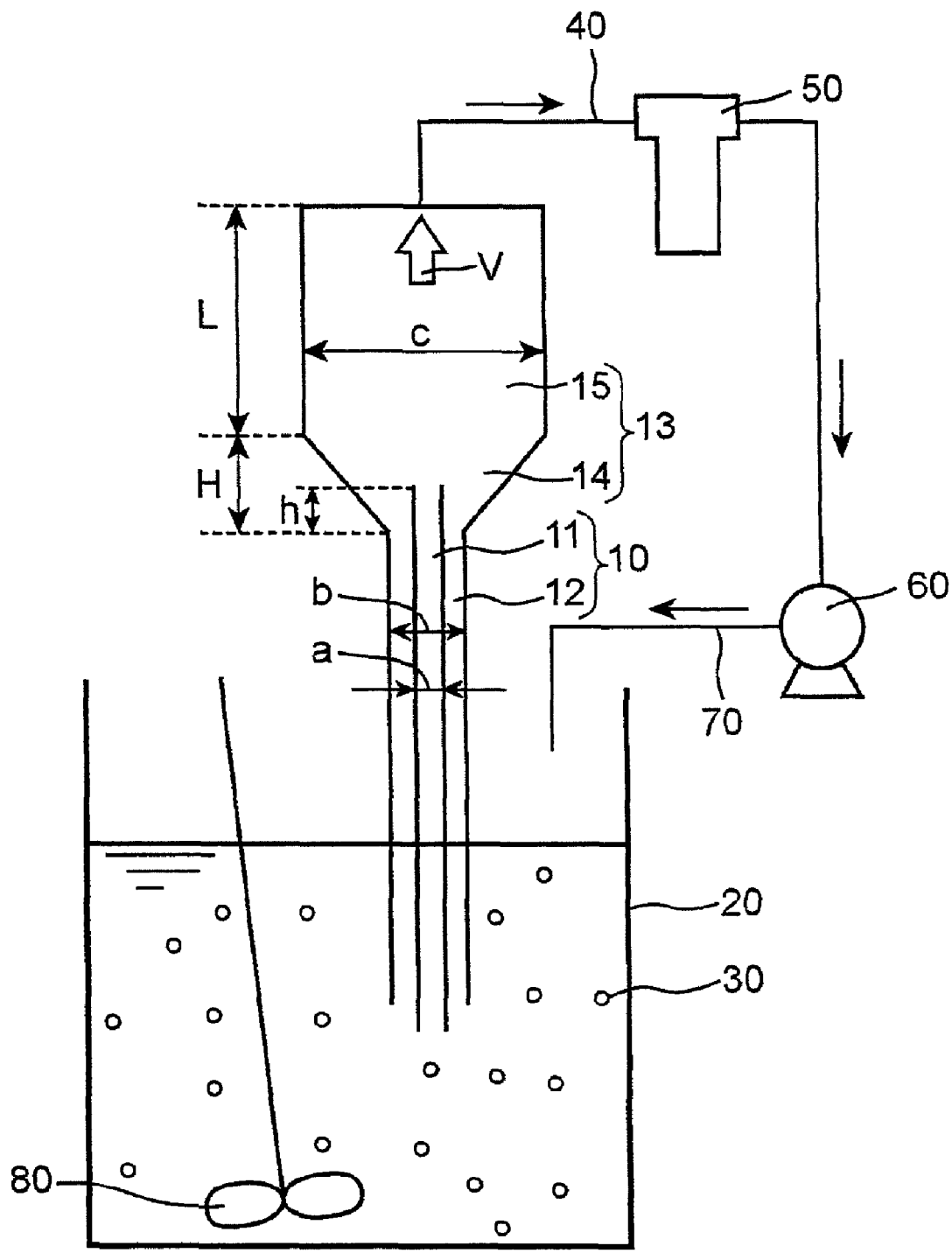
FIG. 1 is a schematic view showing the constitution of a particle classification apparatus to be used in the production process of the present invention.

<<Process for Producing Microcapsules for Electrophoretic Display Devices>>

The process for producing microcapsules for electrophoretic display devices according to the present invention (hereinafter sometimes referred to as the "production process of the present invention") comprises classifying microcapsules for electrophoretic display devices (hereinafter sometimes referred to as the "microcapsules") from a dispersion containing microcapsules in an aqueous medium, using a specific particle classification apparatus. The specific particle classification apparatus has a connecting flow passage toward a dispersion reservoir, a conical part, a barrel part, and a discharging flow passage, in this order from a bottom side of the apparatus, wherein particles are classified from the dispersion contained in the dispersion reservoir by generating a circulating flow of the dispersion in the barrel part until the dispersion reaches the discharging flow passage from the connecting flow passage, and wherein the connecting flow passage is composed of a dispersion feeding flow passage for introducing the dispersion into the conical part and a dispersion draining flow passage for returning the dispersion to the dispersion reservoir, at least a lower portion of the connecting flow passage being immersed from above the dispersion reservoir into the dispersion contained in the dispersion reservoir, and a classifying section composed of the conical part and the barrel part is located outside and above the dispersion reservoir.

That is, the production process of the present invention is intended to produce microcapsules for electrophoretic display devices, having a small coefficient of variation (CV value) of particle diameter, in a simple and easy manner at a high yield on an industrial scale by preparing microcapsules for electrophoretic display devices according to any of the heretofore known processes and then classifying microcapsules for electrophoretic display devices from a dispersion containing the microcapsules for electrophoretic display devices in an aqueous medium, using a specific particle classification apparatus. Therefore, the production process of the present invention is substantially the same as any of the heretofore known processes for producing microcapsules for electrophoretic display devices, comprising the classification treatment of microcapsules for electrophoretic display devices, except that the microcapsules for electrophoretic display devices are classified from a dispersion containing the microcapsules for electrophoretic display devices in an aqueous medium, using a specific particle classification apparatus.

Moreover, the specific particle classification apparatus to be used in the production process of the invention makes it possible to carry out classification treatment with high precision without causing physical damages, even for relatively soft microcapsules, and therefore, can be applied to any of the heretofore known microcapsules for electrophoretic display devices, extending from relatively soft microcapsules such as microcapsules for electrophoretic display devices, each enclosing a dispersion containing electrophoretic particles and a solvent in a shell made of gelatin and gum arabic, to relatively hard microcapsules such as microcapsules for electrophoretic display devices, each enclosing a dispersion containing electrophoretic particles and a solvent in a shell comprising an inner shell made of a mercapto group-containing amino resin and an outer shell made of an epoxy resin. For this reason, the description of a process for preparing microcapsules for electrophoretic display devices will be omitted herein.

In this connection, with regard to a process for preparing microcapsules for electrophoretic display devices, each enclosing a dispersion containing electrophoretic particles and a solvent in a shell made of gelatin and gum arabic, see, e.g., Japanese Patent Laid-open Publication (Kohyo) No. 2002-526812, the disclosure of which is incorporated herein by reference in its entirety as if fully set forth herein. Further, with regard to a process for preparing microcapsules for electrophoretic display devices, each enclosing a dispersion containing electrophoretic particles and a solvent in a shell comprising an inner shell made of a mercapto group-containing amino resin and an outer shell made of an epoxy resin, see, e.g., Japanese Patent Laid-open Publication (Kokai) No. 2008-165191, the disclosure of which is incorporated herein by reference in its entirety as if fully set forth herein.

In general, microcapsules have certain flexibility, so that their shapes may be changed by external pressure, and therefore, their shapes are not particularly limited, but microcapsules may preferably have particle shapes such as spherical shapes when no external pressure is applied thereto.

The average particle diameter of microcapsules is not particularly limited, but it may preferably be 5 µm or greater, more preferably 10 µm or greater, and still more preferably 15 µm or greater, and it may preferably be 300 µm or smaller, more preferably 200 µm or smaller, and still more preferably 150 µm or smaller. If the average particle diameter of microcapsules is too small, it may become impossible to obtain sufficient display density in display parts, so that the display parts cannot definitely be distinguished from the other non-display parts. To the contrary, when the average particle diameter of microcapsules is too great, the strength of the microcapsules may be decreased, and the electrophoretic properties of electrophoretic particles in a dispersion enclosed in the microcapsules cannot sufficiently be exhibited, and accordingly, the driving voltage for display may be increased. In this connection, the average particle diameter of microcapsules means their volume-average particle diameter as measured by an accurate particle size distribution analyzer (e.g., "Multisizer 3" available from Beckman Coulter, Inc.).

The variation coefficient (i.e., the narrowness of particle size distribution; expressed by CV value) of the particle diameter of microcapsules is not particularly limited, but it may preferably be not higher than 14%, more preferably not higher than 12%. The lower limit of the variation coefficient of the particle diameter of microcapsules is not particularly limited, but it may most preferably be 0%. When the variation coefficient of the particle diameter of microcapsules is too high, microcapsules having effective particle diameters may be decreased, and therefore, the number of defective microcapsules in which electrophoretic particles are not moved even by application of a voltage may be increased, which may result in the deterioration of display performance such as reflectance of white display and contrast.

In the production process of the present invention, microcapsules are prepared by any of the heretofore known methods, and microcapsules are then classified from a dispersion containing the microcapsules in an aqueous medium, using a specific particle classification apparatus. When microcapsules are prepared, the microcapsules are ordinarily obtained in the form of a dispersion of the microcapsules contained in an aqueous medium. Therefore, the classification of microcapsules may be carried out so that the microcapsules have a desired particle diameter and a desired particle size distribution using a specific particle classification apparatus for a dispersion containing the microcapsules in an aqueous medium without any further treatment or after dilution with an arbitrary aqueous medium or the like.

The aqueous medium for dispersing microcapsules is not particularly limited, but there can be used for example, water or a mixed solvent of water with a hydrophilic organic solvent. When a mixed solvent of water with a hydrophilic organic solvent is used, the amount of water to be mixed may preferably be not smaller than 70% by mass, more preferably not smaller than 75% by mass, still more preferably not smaller than 80% by mass, and preferably not greater than 95% by mass.

The hydrophilic organic solvent is not particularly limited, but may include alcohols such as methanol, ethanol, n-propyl alcohol, isopropyl alcohol, and allyl alcohol; glycols such as ethylene glycol, propylene glycol, butylene glycol, hexylene glycol, pentane diol, hexane diol, heptane diol, and dipropylene glycol; ketones such as acetone, methyl ethyl ketone, methyl propyl ketone, and methyl isobutyl ketone; esters such as methyl formate, ethyl formate, methyl acetate, and methyl acetoacetate; and ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These hydrophilic organic solvents may be used alone, or two or more kinds of these hydrophilic organic solvents may also be used in combination.

For the aqueous medium, besides water and the hydrophilic organic solvents, other solvents may further be used in combination. Examples of the other solvents may include hexane, cyclopentane, pentane, isopentane, octane, benzene, toluene, xylene, ethylbenzene, aminylsqualene, petroleum ether, terpene, castor oil, soybean oil, paraffin, and kerosene. When any of the other solvents is used in combination, the amount of such a solvent to be used may preferably be not greater than 30% by mass, more preferably not greater than 25% by mass, still more preferably not greater than 20% by mass, relative to an aqueous medium containing water and a hydrophilic organic solvent.

<Particle Classification Apparatus>

The particle classification apparatus to be used for the production process of the present invention is a particle settling type particle classification apparatus for classifying particles from a dispersion in a dispersion reservoir, comprising a connecting flow passage toward the dispersion reservoir, a conical part, a barrel part, and a discharging flow passage in this order from a bottom side of the apparatus. The section composed of the conical part and the barrel part may be referred to as the "classifying section".

Figure 2:
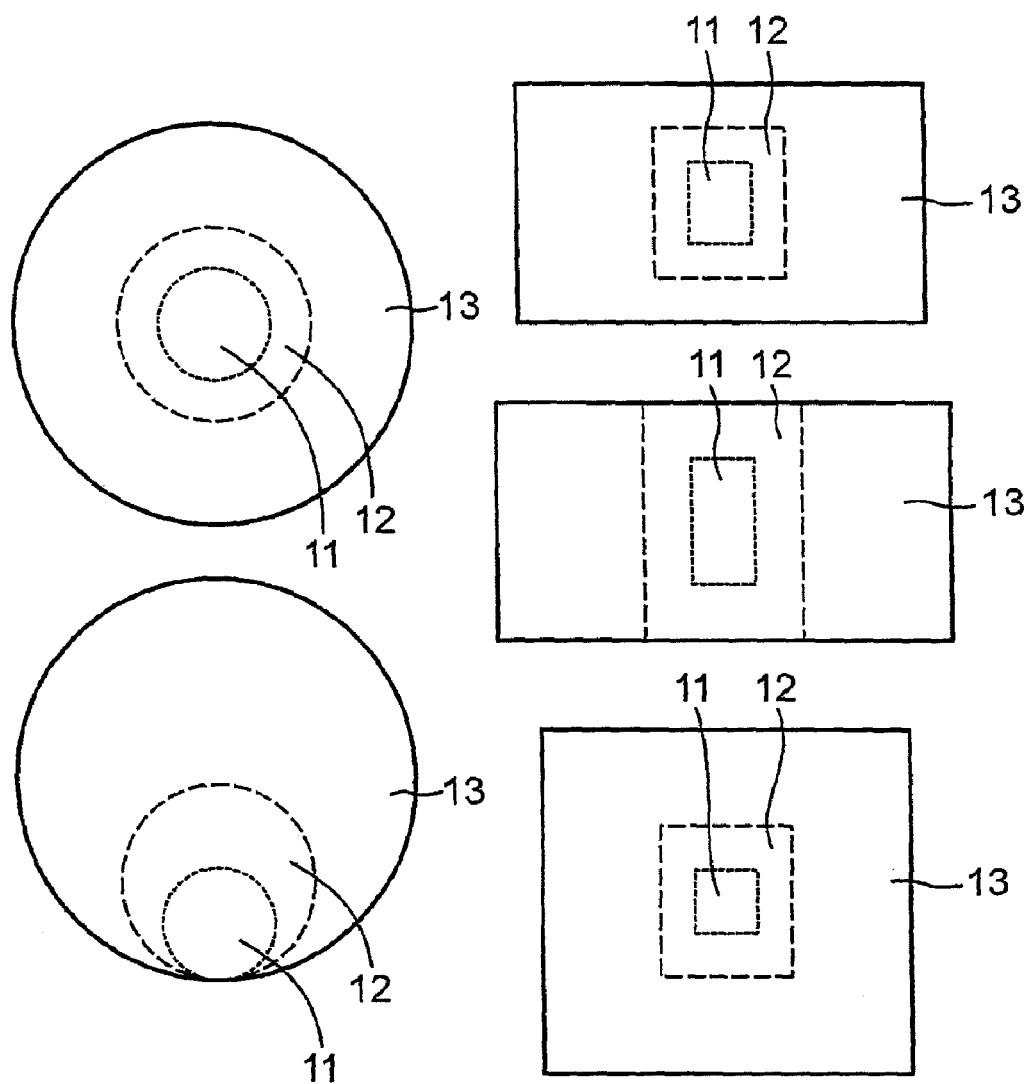
FIG. 2 is schematic sectional views showing various connecting flow passages, each of which is composed of a double tube, as viewed from the side of each conical part, in preferred examples of a particle classification apparatus.
Figure 3:
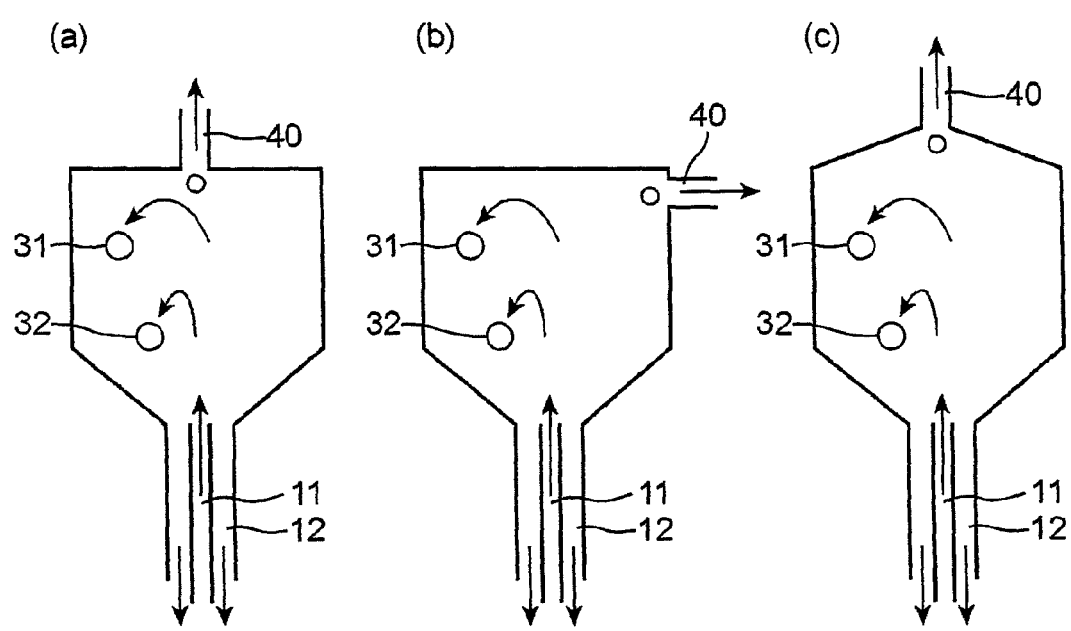
FIG. 3 is schematic sectional views exemplifying the position, at which each of discharging flow passages is connected to each of barrel parts, in preferred examples of a particle classification apparatus.

The above-described particle classification apparatus will hereinafter be described in detail by reference to FIGS. 1, 2, and 3. However, the production process of the present invention is not limited to the following description, but it can be put into practice after appropriate modifications or variations, even with respect to those other than the matters exemplified below, within a range meeting the gists of the present invention.

First, the constitution of a typical example of the particle classification apparatus is shown in FIG. 1. As shown in FIG. 1, in the particle classification apparatus, at least a lower part of a connecting flow passage 10 is immersed in a dispersion contained in a dispersion reservoir 20. The dispersion reservoir 20 may be any one, so long as it can contain a dispersion containing particles 30 in a dispersion medium. The shape of the dispersion reservoir 20 is not particularly limited, but it may be either an opened type reservoir or a closed type reservoir (e.g., a reaction tank). In the inside of the dispersion reservoir 20, the particles 30 may preferably be dispersed in a dispersion medium, and the dispersion reservoir 20 may be equipped with a stirrer 80 or the like. When the dispersion reservoir 20 is equipped with a stirrer 80, stirring force may be one sufficient to prevent the settling of the particles 30 in the dispersion reservoir 20 so that the dispersion may be made uniform. That is, it may be preferred to stir the particles 30 with a force which applies almost no stress to the particles 30.

The connecting flow passage 10 is made to have, for example, the form of a double tube composed of a dispersion feeding flow passage 11 for introducing the dispersion into a classifying section 13 from the dispersion reservoir 20 and a dispersion draining flow passage 12 for returning a portion of the dispersion from the classifying section 13 to the dispersion reservoir 20. This makes it possible to circulate the dispersion contained in the dispersion reservoir 20 so that substantially all of the particles can flow into the classifying section 13 to be subjected to classification treatment at least once, thereby improving classification precision.

The dispersion feeding flow passage 11 is a flow passage in which the dispersion may preferentially be introduced into the classifying section 13 from the dispersion reservoir 20. The number of the dispersion feeding flow passages 11 can be one to more than one, preferably one. Further, the dispersion draining flow passage 12 is a flow passage in which a portion of the dispersion may preferentially be returned to the dispersion reservoir 20 from the classifying section 13. The number of the dispersion draining flow passages 12 can be from one to more than one, preferably one.

The classifying section 13 composed of a conical part 14 for quickly introducing a portion of the dispersion into the dispersion draining flow passage 12 and a barrel part 15 for carrying out classification by generating a circulating flow of the dispersion therein is connected to an upper part of the connecting flow passage 10. In the connecting flow passage 10, the position at which the dispersion feeding flow passage 11 is connected to the classifying section 13 is not particularly limited, so long as it is in the conical part 14. Further, in the connecting flow passage 10, the position at which the dispersion feeding flow passage 12 is connected to the classifying section 13 may preferably be a position at which no particles are deposited in the classifying section 13, and for example, the dispersion feeding flow passage 12 may preferably be connected to the lowermost part (i.e., the top of the cone) of the conical part 14.

As shown in FIG. 1, it may be suitable that at least a lower portion of the connecting flow passage 10 is immersed from above the dispersion reservoir 20 in the dispersion contained in the dispersion reservoir 20 and the classifying section 13 is located outside and above the dispersion reservoir 20. If the classifying section 13 is positioned out of the dispersion reservoir 20, it becomes possible to obtain a sufficient stirring space for preventing the settling of the particles 30 in the dispersion reservoir 20. Further, for example, when the dispersion reservoir 20 is a closed type reservoir, the connecting flow passage 10 may preferably be inserted through a nozzle or the like in the upper portion of the reservoir and immersed in the dispersion. When the liquid surface in the dispersion reservoir 20 is turbulent by stirring or the like, many air bubbles may possibly be mixed in the classifying section due to its influence, and therefore, it may be preferred that the connecting flow passage 10 is sufficiently immersed in the dispersion.

In the connecting flow passage 10, a ratio (b/a) of a horizontal cross-sectional area "b" of the dispersion draining flow passage 12 to a horizontal cross-sectional area "a" of the dispersion feeding flow passage 11 may preferably be set to be not lower than 0.2, more preferably not lower than 0.3, and preferably not higher than 30, more preferably not higher than 20, in order to generate a stable circulating flow of the dispersion in the barrel part 15.

The horizontal cross-sectional area "b" of the dispersion draining flow passage 12 is defined as not including the horizontal cross-sectional area "a" of the dispersion feeding flow passage 11. For example, as described below, in the connecting flow passage 10 with a double tube structure in which the dispersion feeding flow passage 11 is provided in the dispersion draining flow passage 12, the value calculated by subtracting the horizontal cross-sectional area "a" of the dispersion feeding flow passage 12 from the horizontal cross-sectional area of an outer tube including the horizontal cross-sectional area of an inner tube (the dispersion feeding flow passage 11) is defined as the horizontal cross-sectional area "b" of the dispersion draining flow passage 12.

The connecting flow passage 10 may particularly be preferred to have a multiple tube structure in which the dispersion feeding flow passage 11 is provided in the dispersion draining flow passage 12. This makes it possible to smoothly generate, in the barrel part 15, a circulating flow of the dispersion due to the density difference (i.e., the particle concentration difference) of the dispersion. From the viewpoint of design, the connecting flow passage 10 may particularly be preferred to have a double tube structure which is composed of the dispersion feeding flow passage 11 and the dispersion draining flow passage 12. As examples of the double tube structure, schematic sectional views when observed from the conical part 14 are shown in FIG. 2. As exemplified in FIG. 2, the connecting flow passage 10 with a double tube structure may be connected to the conical part 14 at the center of the lower portion of the conical part 14 or may be connected to the conical part 14 at the end of the lower portion of the conical part 14. Further, the horizontal cross-section of a double tube may be circular or polygonal. From the viewpoint of design, it may particularly be preferred to use a double tube which is connected to the conical part 14 at the center of the lower portion of the conical part 14 and which has a circular horizontal cross-section.

In the connecting flow passage 10 with such a multiple tube structure, it may be preferred that the length of the dispersion feeding flow passage 11 is equal to or longer than the length of the dispersion draining flow passage 12. That is, at both ends on the side of the dispersion reservoir 20 and on the side of the classifying section 13, the length of the dispersion feeding flow passage 11 may preferably be equal to or longer than the length of the dispersion draining flow passage 12. This makes it possible to stably generate a circulating flow of the dispersion. Specifically, the ratio (h/H) of a projection length "h" of the dispersion feeding flow passage 11 to a vertical length "H" of the conical part 14 may preferably be zero or higher and may preferably be not higher than 1.0, more preferably not higher than 0.5. In particular, as shown in FIG. 1, it may be preferred that the dispersion draining flow passage 12 is located at the center of the lowest portion of the conical part 14 and is made to have a structure not projected in the conical part 14 and at the same time the dispersion feeding flow passage 11 is made to have a structure projected from the connecting portion between the dispersion draining flow passage 12 and the conical part 14.

The classifying section 13, as described above, is composed of the conical part 14 and the barrel part 15 and is connected to the connecting flow passage 10 in the lower portion of the conical part 14. On the other hand, the barrel part 15 is connected to the upper portion of the conical part 14, and specifically, the barrel part 15 is connected to the portion having the greatest inner diameter of the conical part 14.

The conical part 14 is not particularly limited, so long as it has a horizontal cross-sectional shape gradually widened toward the barrel part 15, and examples thereof may include a conical or pyramidal shape. Further, the conical part 14 has a tilt angle of preferably not smaller than 10°, more preferably not smaller than 15°, and preferably not greater than 60°, more preferably not greater than 45°, when the vertical direction is defined as 0°. The adjustment of the tilt angle to be not smaller than 10° provides practical usability from the viewpoint of design and production. Further, the conical part 14 may preferably have a wall face in the inside thereof, which is smooth so as to allow particles contained in the dispersion to smoothly flow in the inside thereof.

The barrel part 15 is connected to the upper side of the portion with the greatest inner diameter of the conical part 14 (i.e., the portion with the greatest horizontal cross-sectional area of the conical part 14). The shape of the barrel part 15 is not particularly limited, and may be, for example, a cylinder having a horizontal cross-section of a circular, triangular, square, rectangular, hexagonal, octagonal, polygonal, or other shape in the cylindrical portion. The lateral face of the barrel part 15 does not need to be flat or smooth, but may have irregularities and/or slants, so long as they do not prevent a circulating flow of the dispersion in the barrel part 15.

The horizontal diameter "c" of the barrel part 15 (i.e., the diameter of the greatest circle inscribed in the horizontal cross-section thereof) may preferably be determined, taking into consideration the settling rate of particles, the discharge rate, separation flow rate, and safety ratio of the dispersion from the discharging flow passage, or other factors, and, for example, the ratio (c/(a+b)) of the horizontal diameter "c" of the barrel part 15 to the total horizontal cross-sectional area of the connecting flow passage 10 (i.e., the horizontal cross-sectional area "a" of the dispersion feeding flow passage 11+the horizontal cross-sectional surface area "b" of the dispersion draining flow passage 12) may preferably be not lower than 10.

The vertical length (i.e., height) of the barrel part 15 may preferably be set, as described below, depending on the concentration of a dispersion, because a gradient of the particle concentration is formed in the circulating flow region. For example, the ratio (L/c) of the vertical length "L" of the barrel part 15 to the horizontal diameter "c" of the barrel part 15 may preferably be not lower than 1 and may preferably be not higher than 10, more preferably not higher than 5.

When the size of the particle classification apparatus is changed, the ratio (L/c) may preferably be changed to an appropriate value in accordance with a change in the ratio (c/(a+b)). For example, when the ratio (c/(a+b)) is not changed, the ratio (L/c) may also preferably be not changed. When the ratio (c/(a+b)) is increased, the ratio (L/c) may also preferably be increased. When the ratio (c/(a+b)) is decreased, the ratio (L/c) may also preferably be decreased.

To stably generate a circulating flow of the dispersion in the barrel part 15, it may be preferred to determine the sizes or other factors of the respective parts in a manner that the ratio (b/a) of the horizontal cross-sectional area "b" of the dispersion draining flow passage 12 to the horizontal cross-sectional area "a" of the dispersion feeding flow passage 11, the ratio (h/H) of the projection length "h" of the dispersion feeding flow passage 11 to the vertical length "H" of the conical part 14, and the ratio (L/c) of the vertical length "L" of the barrel part 15 to the horizontal diameter "c" of the barrel part 15 are all in the above-described preferred ranges. That is, in the particle classification apparatus to be used for the production process of the present invention, the ratio (b/a) may preferably be not lower than 0.2, more preferably not lower than 0.3, and may preferably be not higher than 20, more preferably not higher than 10; the ratio (h/H) may preferably be zero or higher, and may preferably be not higher than 1.0, more preferably be not higher than 0.5; and the ratio (L/c) may preferably be not lower than 1 and may preferably be not higher than 10, more preferably not higher than 5.

Further, it may be preferred that those which possibly disturb a liquid flow, such as a slanting plate for forcibly causing the settling of particles, or a forcible stirring mechanism, are not provided in the inside of the barrel part 15. If such a forcible mechanism exists in the inside of the barrel part 15, no sufficient circulating flow of the dispersion can be generated in the barrel part 15, and therefore, the classification of particles cannot be carried out smoothly in some cases. It may be more preferred that the barrel part 15 is completely hollow. In this connection, when the barrel part 15 has no forcible mechanism, the shape of the barrel part 15 is not particularly limited, and such a case may be preferred from the viewpoint of design.

Further, the shape of the upper portion (i.e., the shape of a ceiling plate) of the barrel part 15 is not particularly limited; however, it may particularly be preferred that the shape of the upper portion of the barrel part 15 is conical. That is, the shape of the upper portion of the barrel part 15 may preferably has a horizontal cross-section which becomes gradually smaller toward the upper side, and a discharging flow passage 40 described below may preferably be connected to the portion with the smallest horizontal cross-sectional area (i.e., the top of the cone). By making the shape of the upper portion of the barrel part 15 conical in such a manner, a decrease in classification efficiency due to particle retention can be prevented, the particle classification apparatus can be made large, and also, particles having particle diameters greater than the particle diameters to be separated by classification can be prevented from leaping into the discharging flow passage 40.

The discharging flow passage 40 for discharging a dispersion containing particles classified in the classifying section 13 is connected to an upper portion of the classifying section 13. The discharging flow passage 40 can also be used as a flow passage for transporting a dispersion containing classified particles to the next step. The size and shape of the discharging flow passage 40 are not particularly limited, and may be determined, taking into consideration conditions such as those employed in the next step.

The position at which the discharging flow passage 40 is connected to the barrel part 15 is not particularly limited, so long as it is a position at which a dispersion containing particles classified in a classification region described below can be discharged. For example, the discharging flow passage 40 may preferably be located in an upper portion or a side face of the barrel part 15. Typical examples of the position at which the discharging flow passage 40 is connected to the barrel part 15 are shown in FIG. 3. FIG. 3(a) is a schematic view showing the case where the top (i.e., the ceiling plate) of the barrel part 15 is a horizontal plate and the discharging flow passage 40 is connected to the center of the horizontal plate. FIG. 3(b) is a schematic view showing the case where the discharging flow passage 40 is connected to a side face of the barrel part 15. FIG. 3(c) is a schematic view showing the case where the shape of the upper portion of the barrel part 15 is conical and the discharging flow passage 40 is connected to the top of the cone. In these schematic views, the flow of a dispersion and the flow of particles are shown by arrows (black).

In the particle classification apparatus as described above, after flowing into the classifying section 13 though the dispersion feeding flow passage 11, the dispersion containing the particles 30 flows out of the classifying section 13 through the discharging flow passage 40 and the dispersion draining flow passage 12. At that time, when the flow speed (mm/min.) of the dispersion flowing into the classifying section 13 through the dispersion feeding flow passage 11 is defined as $V_{in}$, the flow speed (mm/min.) of the dispersion flowing out of the classifying section 13 through the discharging flow passage 40 is defined as $V_{Aout}$, and the flow speed (mm/min.) of the dispersion flowing out of the classifying section 13 through the dispersion draining flow passage 12 is defined as $V_{Bout}$, these flow speeds meet the relationship expressed by the following equation (1):

$$V_{in} = V_{Aout} + V_{Bout} \quad (1).$$

When many fine particles are contained in the dispersion flowing into the classifying section 13 through the dispersion feeding flow passage 11, $V_{Bout}$ becomes low and a circulating flow of the dispersion in the barrel part 15 becomes large. On the other hand, when a few fine particles are contained in the dispersion flowing into the classifying section 13 through the dispersion feeding flow passage 11, $V_{Bout}$ becomes high and a circulating flow of the dispersion in the barrel part 15 becomes small.

As shown in FIG. 1, the particle classification apparatus may preferably further comprise a particle trapping part 50 for trapping particles from the dispersion flowing out of the classifying section 13 through the discharging flow passage 40 and a pump 60 connected to the particle trapping part 50. This makes it possible to entirely trap all of the particles classified from the dispersion and to transfer the remaining dispersion medium as well. In this case, the remaining dispersion medium may be transferred to the next step.

The particle trapping part 50 is not particularly limited as to its material or manufacturer, so long as it is a filter having a pore size sufficient for trapping particles each having a particle diameter in such a range that the particles are to be classified. In addition, since the shape of the particle trapping part 50 may appropriately be selected, depending on the property and shape of particles to be classified, the stress to be applied at the time of trapping the particles or the stress to be applied at the time of taking out the trapped particles can be made minimum and the stress on the particles can be lowered.

As shown in FIG. 1, the particle classification apparatus may preferably further comprises a circulating flow passage 70 for the dispersion medium to return from the particle trapping part 50 to the dispersion reservoir 20 through the pump 60. This makes it possible to carry out classification treatment by repeatedly leading the dispersion medium into the classifying section 13 from the dispersion reservoir 20, and therefore, the amount of waste solution can be reduced and the amount of the dispersion medium in the system can also be kept constant. Further, a closed channel can be formed in the particle classification apparatus, and therefore, scattering of the dispersion can be prevented and also it becomes easy to control gas concentration such as oxygen concentration.

<Classification Treatment of Microcapsules>

In the production process of the present invention, microcapsules for electrophoretic display devices are produced and then classified from a dispersion containing microcapsules in an aqueous medium, using a particle classification apparatus such as described above.

Figure 4:
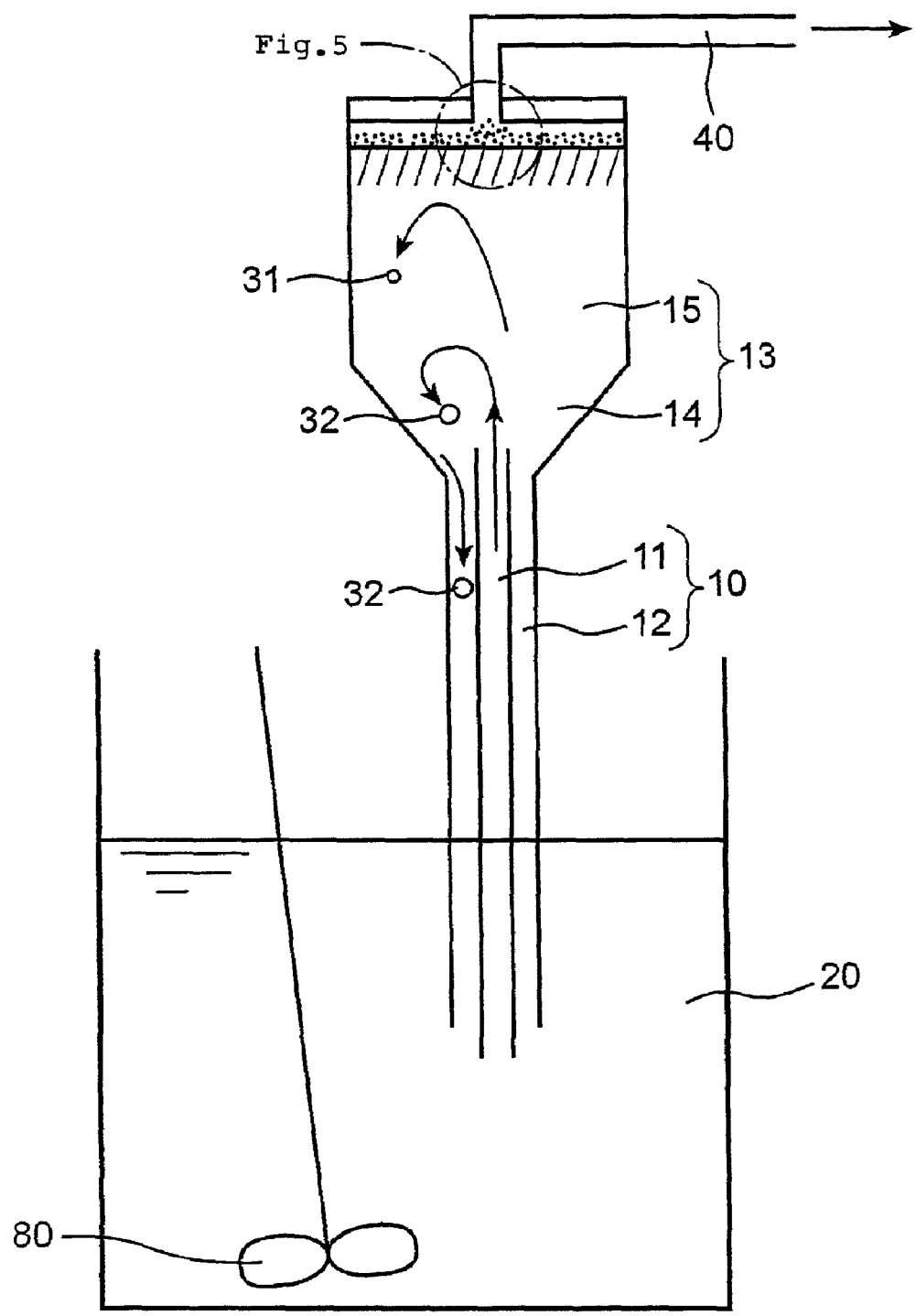
FIG. 4 is a schematic sectional view showing one example of the mode for carrying out the classification treatment of microcapsules.
Figure 5:
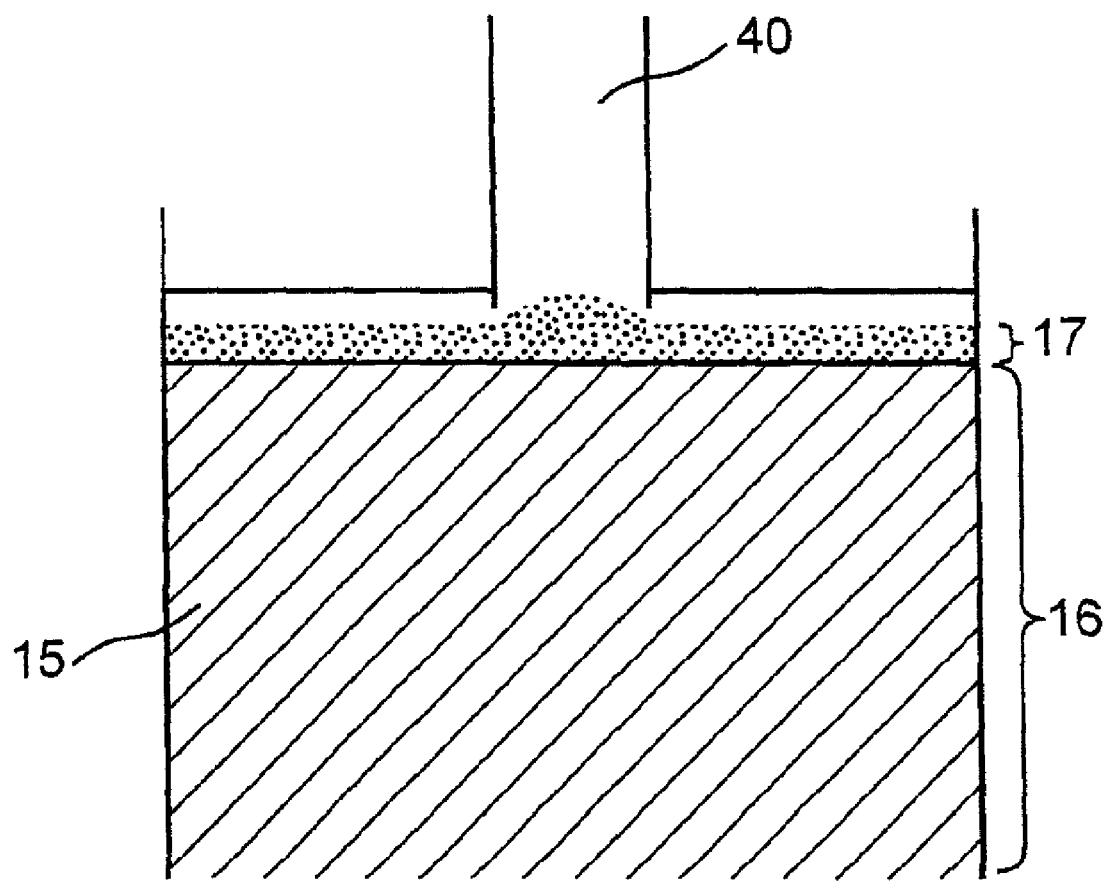
FIG. 5 is an enlarged schematic sectional view showing a designated portion of FIG. 4.

The classification treatment of microcapsules will hereinafter be described in detail by reference to FIGS. 1, 4, and 5. However, the production process of the present invention is not limited to the following description, but it can be put into practice after appropriate modifications or variations, even with respect to those other than the matters exemplified below, within a range meeting the gists of the present invention.

First, a dispersion medium is fed to the dispersion reservoir 20 and the pump 60 is driven, thereby stating dispersion treatment in a state where the system is filled with the dispersion medium. After the dispersion reservoir 20 is filled with the dispersion medium, the pump 60 is once stopped, and particles or a dispersion containing these particles is fed to the dispersion reservoir 20, and a dispersion or a dispersion medium is fed, if necessary, so as to provide a desired particle concentration. After that, the dispersion is uniformly stirred, if necessary, using the stirrer 80. Further, if necessary, while stirring is continued in the dispersion reservoir 20, the pump 60 is operated again and the flow rate of the pump 60 is adjusted so that the ascent rate "V" of the dispersion in the barrel part 15 (the ascent rate "V" is equal to the discharge rate of the dispersion from the discharging flow passage 40) becomes a prescribed rate appropriately set based on the Stokes settling rate of the classified particles. During the classification treatment, if necessary, a dispersion medium is added to the dispersion reservoir 20 so that at least a lower portion of the connecting flow passage 10 is immersed in the dispersion contained in the dispersion reservoir 20.

The dispersion contained in the dispersion reservoir 20 is introduced into the classifying section 13 through the dispersion feeding flow passage 11 by driving the pump 60 again. In the classifying section 13, as shown by the arrows (black) in FIG. 4, particles 31 having small particle diameters ascend up to an upper portion of the classifying section 13 and settle out due to their small specific gravities, whereas particles 32 having great particle diameters ascend up to a lower portion of the classifying section 13 and settle out due to their great specific gravities. Therefore, the concentration of the particles 32 having great particle diameters is increased in the lower portion of the conical part 14 and the dispersion with a high concentration of the particles 32 having great particle diameters is returned to the dispersion reservoir 20 through the dispersion draining flow passage 12. Thus, there can be generated a circulating flow of the dispersion flowing from the dispersion reservoir 20 through the dispersion feeding flow passage 11 to the classifying section 13 and further being returned to the dispersion reservoir 20 through the dispersion draining flow passage 12 from the bottom of the conical part 14.

During the classification treatment, when the dispersion flows into the barrel part 15 through the dispersion feeding flow passage 11 and the conical part 14 from the dispersion reservoir 20, the barrel part 15 is separated into a circulating flow region 16 in which the dispersion is circulated and a classifying region 17 in which the particles are classified from the dispersion. The circulating flow region 16 is a region where a circulating flow of the dispersion is generated in such a manner that the flow of the dispersion flowing in through the dispersion feeding flow passage 11 gradually spreads in the channel having, as the top, the classifying region 17, through the conical part 14, and moves along the wall face of the barrel part 15, and then passes from the conical part 14 through the dispersion draining flow passage 12 to the dispersion reservoir 20. Further, the classifying region 17 is a region covering from the upper portion of the circulating flow region 16 in the barrel part 15 to the discharging flow passage 40 provided in the upper portion of the barrel part 15.

In the barrel part 15, the particle concentration is gradually decreased toward the classifying region 17 of the barrel part 15 from the bottom of the conical part 14, and the particle concentration in the classifying region 17 becomes the particle concentration in the spontaneous settling region (i.e., a region having a particle velocity corresponding to the Stokes settling rate). This makes it possible that the diameter (cut point) of particles to be classified in the classifying region 17 becomes a single point and particles having particle diameters smaller than this particle diameter are discharged out of the discharging flow passage 40. Further, the interference settling of the particles 30 occurs in the circulating flow region 16 and a gradient of the particle concentration is formed. FIGS. 4 and 5 conceptually show such a state. In FIG. 5, there is shown the state where the barrel part 15 is separated into the circulating flow region 16 (i.e., the interference settling region) and the classifying region 17 (i.e., the spontaneous settling region) and the discharging flow passage 40 comes in contact with the classifying region 17.

A reason for the formation of a gradient of the particle concentration in the circulating flow region 16 is supposed to be a difference between the settling in the static medium and the settling in the flowing medium. If the ascending flow rate of the dispersion in the classifying region 17 is a rate corresponding to the spontaneous settling rate of the particles, the interference settling rate is lower than the spontaneous settling rate, and therefore, the ascending flow rate of the dispersion in the circulating flow region 16 is assumed to be higher than the ascending flow rate of the dispersion in the classifying region 17. Accordingly, it is theoretically supposed that a particle settling phenomenon may hardly occur in the circulating flow region 16. However, it is assumed that settling in the flowing medium may show a settling phenomenon different from the settling phenomenon in the static medium, as described below, and therefore, it is supposed that a gradient of the particle concentration may be formed in the circulating flow region 16 and there may occur a particle settling phenomenon depending on the particle diameters.

That is, in the static medium, regardless of particle diameters, the settling rate of particles becomes the same due to interference among particles, whereas in the flowing medium, the force of a medium flow is added to particles although there is interference among the particles and the movements of the respective particles are not synchronized; therefore, interference among the particles becomes weak and the settling rate vector is combined with the flow rate vector, and it is supposed that even at the particle concentration causing interference settling, there may occur a particle settling phenomenon depending on particle diameters.

For these reasons, it is supposed that a gradient of the particle concentration may be formed in the circulating flow region 16, and further, it can be understood that the formation of an ascending flow at a rate corresponding to the spontaneous settling rate of particles is needed for classification treatment.

The classification particle diameter (cut point) can freely be set by appropriately changing the ascending flow rate of a dispersion in the classifying region 17 depending on the spontaneous settling rate of particles (i.e., the discharge rate of the dispersion out of the discharging flow passage 40).

Further, to efficiently form a gradient of the particle concentration in the circulating flow region 16, it may be preferred to use, as the dispersion, a dispersion having a particle concentration suitable for the occurrence of interference settling. Specifically, the preferred particle concentration may be set depending on the specific gravity of particles, and for example, it may preferably be 5% by mass or higher, more preferably 10% by mass or higher, and may preferably be 40% by mass or lower, more preferably 30% by mass or lower, relative to 100% by mass of the dispersion. When the dispersion has such a particle concentration, a gradient of the particle concentration is formed in the circulating flow region 16, and the classification of particles is achieved in the classifying region 17. Further, taking into consideration productivity and environmental issues (e.g., reduction of waste solution), industrially, it may be preferred to carry out classification at such an interference settling concentration. The particle concentration as used herein means the particle concentration of the dispersion contained in the dispersion reservoir 20.

In the lower portion of the classifying section 13 (e.g., the conical part 14 or the lower portion of the circulating flow region 16 in the barrel part 15), the density of the dispersion is increased because particle concentration becomes higher than that of the dispersion contained in the dispersion reservoir 20. Further, the particles 30 are returned to the dispersion reservoir 20 through the dispersion draining flow passage 12 due to a difference in their specific gravities, and therefore, the particle concentration of the dispersion in the classifying section 13 is not increased beyond necessity.

The ascent rate "V" of the dispersion in the classifying region 17 is equal to the discharge rate of the dispersion out of the discharging flow passage 40, and the spontaneous settling rate "U" of the particles 30 can be determined by the following Stokes formula (2):

$$U = d_p^2 (\rho_p - \rho) g / 18\mu \tag{2}$$

wherein U denotes the spontaneous settling rate of the particles; $d_p$, the diameter of the particles (spherical particles); $\rho_p$, the density of the particles; $\rho$, the density of a dispersion medium; g, gravity acceleration; and $\mu$, the viscosity of the dispersion medium.

In the case of the microcapsules for electrophoretic display devices according to the present invention, the density $\rho_p$ of the particles in the above formula (2) can be replaced, if the microcapsules have thin shells, with the density of a dispersion for electrophoretic display devices, which is to be microcapsulated.

The settling rate of particles in the circulating flow region 16, i.e., the interference settling rate of particles, can be determined by a method in which a dispersion having the same particle concentration as that of the dispersion contained in the dispersion reservoir 20 is put in a transparent cylindrical tube having a diameter receiving no effect of its tube wall, such as a measuring cylinder, and is kept still, followed by measuring the distance of settling (i.e., the distance of lowering of a separation interface) for a prescribed period of time. In the interference settling, an apparent interface is formed between the particle dispersion layer and the supernatant layer, and therefore, measurement is easy. However, the interference settling rate may vary with the particle concentration, and therefore, it is important that the concentration is matched with the particle concentration of the dispersion contained in the dispersion reservoir 20. The settling rate of particles to be classified may preferably be not lower than 0.01 mm/min., more preferably not lower than 0.02 mm/min., and may preferably be not higher than 50 mm/min., and more preferably not higher than 35 mm/min.

When some time passes after the pump 60 is driven again, the circulating flow region 16 and the classifying region 17 are formed in the barrel part 15, resulting in the start of classification. When it is confirmed whether prescribed classification is carried out or not by sampling the particles discharged out of the discharging flow passage 40 and the deviation of classification particle diameter is observed, the flow rate of the pump is changed and adjusted to provide a proper classification particle diameter (cut point).

The dispersion containing particles each having a particle diameter smaller than the classification particle diameter (cut point) is led to the particle trapping part 50 through the discharging flow passage 40. In the particle trapping part 50, all of the particles contained in the dispersion are trapped with a filter having an appropriate pore size. The remaining dispersion medium is returned to the dispersion reservoir 20 through the circulating flow passage 70 via the pump 60.

To obtain microcapsules having a small coefficient of variation (CV value) of particle diameter, for example, microcapsules for electrophoretic display devices, each having a particle diameter equal to or greater than the first particle diameter, may be removed by classification, and then, with respect to the remaining microcapsules for electrophoretic display devices, microcapsules for electrophoretic display devices, each having a particle diameter equal to or smaller than the second particle diameter which is smaller than the first particle diameter, may be removed by classification. Alternatively, microcapsules for electrophoretic display devices, each having a particle diameter equal to or smaller than the second particle diameter, may be removed by classification, and then, with respect to the remaining microcapsules for electrophoretic display devices, microcapsules for electrophoretic display devices, each having a particle diameter equal to or greater than the first particle diameter which is greater than the second particle diameter, may be removed by classification.

Specifically, for example, classification may be carried out by setting the classification particle diameter (cut point) to be great and microcapsules each having a particle diameter smaller than the classification particle diameter (cut point) may be trapped in the particle trapping part 50, and then, with respect to the resultant microcapsules, i.e., the microcapsules obtained after removing microcapsules, each having a particle diameter equal to or greater than the classification particle diameter (cut point) (i.e., the first particle diameter), by classification, classification may be carried out by setting the classification particle diameter (cut point) to be small and microcapsules each having a particle diameter equal to or smaller than the classification particle diameter (cut point) (i.e., the second particle diameter smaller than the first particle diameter) may be removed by trapping in the particle trapping part 50 to obtain microcapsules having a small coefficient of variation (CV value) of particle diameter.

Alternatively, classification may be carried out by setting the classification particle diameter (cut point) to be small and microcapsules each having a particle diameter smaller than the classification particle diameter (cut point) (i.e., the second particle diameter) may be removed by trapping in the particle trapping part 50, and then, classification may be carried out by setting the classification particle diameter (cut point) to be great and microcapsules each having a particle diameter smaller than the classification particle diameter (cut point) (the microcapsules obtained after removing microcapsules, each having a particle diameter equal to or greater than the classification particle diameter (cut point) (i.e., the first particle diameter), by classification, i.e., microcapsules having a small coefficient of variation (CV value) of particle diameter) may be trapped in the particle trapping part 50.

Thus, the classification of microcapsules from a dispersion containing the microcapsules in an aqueous medium, using a specific classification apparatus, makes it possible to produce microcapsules having a small coefficient of variation (CV value) of particle diameter in a simple and easy manner at a high yield. According to the production process of the present invention, there can be obtained microcapsules for electrophoretic display devices, of which coefficient of variation (CV value) of particle diameter may preferably be not higher than 14%.

<<Sheet for Electrophoretic Display Devices>>

The sheet for electrophoretic display devices (hereinafter sometimes referred to as the "display sheet") according to the present invention comprises a layer containing microcapsules obtained by the production process of the invention and a binder resin. In the display sheet of the present invention, the microcapsules are arranged in planar form as a whole and are fixed by the binder resin to keep the arrangement. Further, in the display sheet of the present invention, the layer containing the microcapsules and the binder resin may preferably be formed on an electrically conductive film.

The display sheet of the present invention is the same as any of the heretofore known sheets for electrophoretic display devices, except that it comprises microcapsules obtained by the production process of the present invention. Therefore, the descriptions on the display sheet of the present invention and its production process will be omitted herein.

In this connection, with respect to the display sheet for electrophoretic display devices and its production process, see, e.g., Japanese Patent Laid-open Publication (Kokai) No. 2008-165191, the disclosure of which is incorporated herein by reference in its entirety as if fully set forth herein.

<<Electrophoretic Display Device>>

The display sheet of the present invention can be used, for example, as the constituent element of a data displaying part for electrophoretic display devices. The electrophoretic display device of the present invention comprises a data displaying part, wherein the data displaying part has the display sheet of the present invention. The electrophoretic display device of the present invention is the same as any of the heretofore known electrophoretic display devices, except that the data displaying part has the display sheet of the present invention. For this reason, parts other than the data displaying part, for example, a driving circuit and an electric power supply circuit, may be constructed in the same manner as in any of the heretofore known electrophoretic display devices. In other words, the electrophoretic display device of the present invention can be obtained by constructing the data displaying part in any of the heretofore known electrophoretic display devices with the display sheet of the present invention. In the present invention, the data displaying part alone may be referred to as an electrophoretic display device by incorporating the driving circuit and the electric power supply circuit into an external circuit.

As the electrophoretic display device of the present invention, there may preferably be exemplified an electrophoretic display device comprising, as the constituent element of a data displaying part, a display sheet selected from the display sheets of the present invention and obtained by laminating a layer containing microcapsules and a binder resin between two opposed electrode films. In such an electrophoretic display device, various constituent parts other than the display sheet (e.g., a driving circuit and an electric power supply circuit) may be those which are used in the heretofore known electrophoretic display devices, as described above.

The required display action in the electrophoretic display device of the present invention can be carried out by applying a controlled voltage to the opposed electrode films (e.g., applying a voltage only to the parts where desired images are to be displayed), thereby changing the oriented positions of electrophoretic particles in the microcapsules. If a driver layer including thin film transistors using amorphous silicon or polysilicon or organic transistors using organic molecules is formed in one electrode film, the display control can be carried out. Alternatively, without forming a driver layer, the display control may be carried out by an outer device. The means for display control may appropriately be selected depending upon the applications of the electrophoretic display device and is not particularly limited.

<<Electronic Equipments>>

The electrophoretic display device obtained using the display sheet of the present invention can be used, for example, as a data displaying means for electronic equipments. The electronic equipment of the present invention comprises a displaying means, wherein the data displaying means has the electrophoretic display device of the present invention. The "data displaying means" as used herein refers to a means for displaying character data, image data, and the like. The electronic equipment of the present invention is the same as any of the heretofore known electronic equipments, except that the data displaying means has the electrophoretic display device of the present invention. Therefore, parts other than the data displaying means may be the same as those of the heretofore known electronic equipments. That is, the electronic equipment of the present invention can be obtained by replacing the data displaying means in any of the heretofore known electronic equipments with the electrophoretic display device of the present invention.

The electronic equipment to which the electrophoretic display device of the present invention can be applied is not particularly limited, so long as the electronic equipment comprises a data displaying means. Examples of the electronic equipment may include personal computers, work stations, word processors, IC cards, IC tags, electronic notepads, electronic dictionaries, IC recorders, electronic books, electronic papers, electronic notebooks, electronic calculators, electronic newspapers, electronic white boards, direction boards, advertisement boards, various types of displays, TV sets, DVD players, digital still cameras, view finder-type or monitor direct view-type video cameras, car navigation systems, mobile phones, videophones, pagers, mobile terminals, POS terminals, and various kinds of equipments having touch panels. These electronic equipments have heretofore been known, and the electronic equipment of the present invention can be obtained by replacing their data displaying means with the electrophoretic display device of the present invention.

EXAMPLES

The present invention will be described below in detail by reference to Examples, but the present invention is not limited to these Examples. The present invention can be put into practice after appropriate modifications or variations within a range meeting the gists described above and later, all of which are included in the technical scope of the present invention. In the following, "%" represents "% by mass" in the case of concentration or solid content.

First, the following will describe a method of measuring the particle diameter of electrophoretic particles, a method of measuring the particle size distribution of microcapsules, a method of measuring the reflectance of white display and contrast of electrophoretic display devices, and a method of evaluating the display state of electrophoretic display devices.

<Particle Diameter of Electrophoretic Particles>

The particle diameter of electrophoretic particles was measured as their volume-average particle diameter using a dynamic light scattering particle size analyzer ("LB-500" available from Horiba, Ltd.).

<Particle Size Distribution of Microcapsules>

The particle size distribution of microcapsules was measured by an accurate particle size distribution analyzer ("Multisizer 3" available from Beckman Coulter, Inc.) to determine the volume-average particle diameter of microcapsules and the coefficient of variation (CV value) thereof. The coefficient of variation (CV value) of particle diameter of microcapsules can be calculated by the following equation (3):

Coefficient of variation (CV value) of particle diameter (%) =[standard deviation (μm) of particle diameter/volume-average particle diameter (μm)]×100     (3).

<Reflectance of White Display and Contrast of Electrophoretic Display Devices>

A direct current voltage of 15 V was applied between both electrodes of each electrophoretic display device (the display part thereof had a height of 5 cm and a width of 3 cm) for 0.4 seconds to carry out white display or black display. The reflectance of each display was measured with a Macbeth spectroscopic densitometer ("SpectroEye" available from Gretag Macbeth AG), and the contrast (i.e., ratio of reflectance) was calculated by the following equation:

Contrast=reflectance of white display/reflectance of black display.

In this connection, the reflectance of white display and the reflectance of black display were separately measured by applying a voltage with changed polarity, and each reflectance was defined as an average of measurement values obtained for the entire one side face of each electrophoretic display device.

<Display State of Electrophoretic Display Devices>

Each electrophoretic display device was observed with a digital microscope ("VHX-500" available from Keyence Corporation) when white display or black display was carried out under the same conditions as those employed for the measurement of contrast, and the average number of defective microcapsules exhibiting no electrophoresis was determined, which microcapsules were observed in the field of view with 500-fold magnification of the digital microscope at arbitrary three points.

Then, the following will describe a material of an inner shell made of a mercapto group-containing amino resin and preparation examples of a dispersion for electrophoretic display devices.

Preparation Example 1

A 100-mL round-bottomed separable flask was charged with 7.5 g of melamine, 7.5 g of urea, 30 g of a 37% aqueous formaldehyde solution, and 3 g of 25% ammonia water, and the mixture was heated to 70° C. under stirring. After the mixture was kept at the same temperature for 1.5 hours, the mixture was cooled to 30° C. to obtain an aqueous solution (A) with a solid content of 54.4% containing a melamine-urea-formaldehyde initial condensation product.

Preparation Example 2

A 300-mL separable flask equipped with stirring blades, a thermometer, and a condenser tube was charged with 50 g of titanium black (having a volume-average particle diameter of 0.21 μm), of which particle surfaces had been subjected to silica treatment by a sol-gel method using trimethoxysilane and methacryloxypropyltrimethoxysilane, 25 g of dodecyl methacrylate, 5 g of 2-ethylhexyl acrylate, and 100 g of hexane, and the separable flask was put in an ultrasonic bath ("BRANSON 5210" available from Yamato Scientific Co., Ltd.) at 55° C., followed by ultrasonic dispersion treatment under stirring for 3 hours.

Then, 5 g of a toluene solution containing 2 g of azobis-dimethylvaleronitrile was added to the separable flask, and the separable flask was transferred to a hot water bath at 65° C., followed by polymerization at the same temperature for 5 hours. After cooling, the polymerization solution was subjected to centrifugation using a centrifugal separator. The titanium black thus separated was dispersed again in 100 g of hexane, followed by centrifugation. After this operation was repeated three times, the titanium black was dried at 100° C.

A 100-mL separable flask was charged with 30 g of the titanium black thus washing treated and 50 g of Isoper M (available from Exxon Mobil Chemical), and the separable flask was put in an ultrasonic bath ("BRANSON 5210" available from Yamato Scientific Co., Ltd.) at 55° C., followed by ultrasonic dispersion treatment under stirring for 2 hours, to obtain 90 g of a dispersion with a solid content of 30% containing titanium black subjected to polymer grafting treatment (in which the treatment was carried out with an acrylic polymer produced by reaction with vinyl groups existing in the silica treatment layers on the surfaces of the titanium black).

The particle diameter of electrophoretic particles contained in this dispersion was measured, and the volume-average particle diameter thereof was found to be 0.22 μm.

On the other hand, a 300-mL separable flask equipped with stirring blades was charged with 50 g of titanium dioxide ("Tipaque CR 90" available from Ishihara Sangyo Kaisha, Ltd.), 5 g of an acrylic polymer (having a weight-average molecular weight of 6,800) made of dodecyl methacrylate, 2-ethylhexyl acrylate, and γ-methacryloxypropyltrimethoxysilane (their relative proportion being 80:15:5), and 100 g of hexane, and the separable flask was put in an ultrasonic bath ("BRANSON 5210" available from Yamato Scientific Co., Ltd.) at 55° C., followed by ultrasonic dispersion treatment under stirring for 2 hours.

This separable flask was transferred to a hot water bath at 80° C., and the solvent was removed. The titanium dioxide which became in a powder state was taken out of the flask, transferred to a tray, and then heat treated in a dryer at 150° C. for 5 hours.

The titanium dioxide thus heat treated was dispersed in 100 g of hexane, and separated by centrifugation using a centrifugal separator, followed by washing. After this operation was repeated three times, the titanium dioxide was dried at 100° C.

A 200-mL separable flask was charged with 50 g of the titanium dioxide thus washing treated and 50 g of Isoper M (available from Exxon Mobil Chemical) and the flask was put in an ultrasonic bath (trade name: BRANSON 5210, available from Yamato Kagaku Co., Ltd.) at 55° C., followed by ultrasonic dispersion treatment under stirring for 2 hours, to obtain 100 g of a dispersion with a solid content of 50% containing titanium dioxide subjected to polymer grafting treatment (in which the alkoxysilyl groups of the acrylic polymer were reacted with silanol groups existing on the surfaces of the titanium dioxide).

The particle diameter of electrophoretic particles contained in this dispersion was measured, and the volume-average particle diameter thereof was found to be 0.25 μm.

A 200-mL mayonnaise bottle was charged with 10 g of the above dispersion of titanium black subjected to the polymer grafting treatment, 70 g of the above dispersion of titanium dioxide subjected to the polymer grafting treatment, and 20 g of Isoper M (available from Exxon Mobil Chemical), and the content was sufficiently mixed to obtain a dispersion for electrophoretic display devices, having electrophoretic particle concentrations of 3% for titanium black and 35% for titanium dioxide.

Example 1

<Preparation of Microcapsules>

First, a 500-mL flat-bottomed separable flask was charged with 120 g of an aqueous solution containing 20 g of gum arabic dissolved therein, and 100 g of the dispersion for electrophoretic display devices was added, while being stirred at 600 rpm using a disper ("T.K. ROBOMICS" available from PRIMIX Corporation). After that, the stirring speed was changed to 1,600 rpm, followed by stirring for 5 minutes, and the stirring speed was then changed to 1,000 rpm, and 100 g of water was added to obtain a suspension.

This suspension was put in a 300-mL four-necked separable flask equipped with a thermometer and a condenser tube, and while being kept at 40° C. and being stirred by paddle blades, there was added 48 g of the aqueous solution (A) of the melamine-urea-formaldehyde preliminary condensation product. After 15 minutes, 100 g of an aqueous solution containing 2 g of L-cysteine dissolved therein was added dropwise by a dropping funnel over 5 minutes. While being kept at 40° C., reaction was carried out for 4 hours, and temperature was then increased to 50° C., and aging was carried out for 2 hours to obtain a dispersion of microcapsules each enclosing the dispersion for electrophoretic display devices in an inner shell made of a mercapto group-containing amino resin.

The microcapsule dispersion thus obtained was cooled to 25° C. and put in a 2-L beaker, and water was added to adjust the entire amount to be 1,000 mL. The dispersion was kept still to precipitate the microcapsules, and the supernatant solution was discarded. This operation was repeated three times to wash the microcapsules.

Then, water was added to the microcapsules to obtain 200 g of a dispersion, and the dispersion was transferred to the above flat-bottomed separable flask and heated to 40° C. under stirring.

To this microcapsule dispersion was added 100 g of an aqueous solution containing 15 g of polyglycerol polyglycidyl ether ("Denacol EX-521" (having a weight-average molecular weight of 732 and a solubility in water of 100%) available from Nagase Chemtex Corporation), as an epoxy compound, dissolved therein. After 30 minutes, 50 g of an aqueous solution containing 2 g of sodium diethyldithiocarbamate dissolved therein was added dropwise by a dropping funnel over 5 minutes. While being kept at 40° C., reaction was carried out for 3 hours, and temperature was then increased to 50° C., and aging was carried out for 1 hour to obtain a dispersion of the microcapsules each enclosing the dispersion for electrophoretic display devices in a shell having an inner shell made of a mercapto group-containing amino resin and an outer shell made of an epoxy resin and formed on the outer surface of the inner shell.

The dispersion thus obtained was cooled to 25° C. and put in a 2-L beaker, and water was added to adjust the entire amount to be 1,000 mL. The dispersion was kept still to precipitate the microcapsules, and the supernatant solution was discarded. This operation was repeated three times to wash the microcapsules.

Thus, microcapsules (1-0) for electrophoretic display devices were obtained. The particle size distribution of microcapsules (1-0) for electrophoretic display devices was measured, and it was found that the volume-average particle diameter and coefficient of variation (CV value) thereof were 40 μm and 28%, respectively. The results are shown in Table 1.

<Classification Treatment to Remove Coarse Microcapsules>

Using the particle classification apparatus as shown in FIG. 1 (the horizontal cross-sectional area "a" of the dispersion feeding flow passage $11$=0.785 cm$^2$; the horizontal cross-sectional area "b" of the dispersion draining flow passage $12$=1.413 cm$^2$; the horizontal cross-sectional area "c" of the barrel part $15$=60.8 cm$^2$; the height "H" of the conical part $14$=7 cm; the projection length "h" of the dispersion feeding flow passage=1 cm; the height "L" of the barrel part $15$=13 cm; the diameter and depth of the dispersion reservoir $20$ were 18 cm and 40 cm, respectively) and a filter having a nominal pore diameter of 1 μm ("polypropylene wound cartridge filter TCW-1N-PPS" available from Advantec Toyo Kaisha, Ltd.) as the particle trapping part $50$, classification treatment was carried out as described below. In this Example, the first particle diameter was set to be 45 μm. (In the Stokes equation (2), as the density $\rho_p$ of the particles, there was used the density calculated from the components contained in the dispersion for electrophoretic display devices, having electrophoretic particle concentrations of 3% for titanium black and 35% for titanium dioxide, which was obtained in Preparation Example 2.)

First, 3 kg of water was fed to the dispersion reservoir $20$, and the pump $60$ was operated to fill the system with water. An aqueous dispersion containing 1.6 kg of microcapsules (1-0) for electrophoretic display devices was fed to the dispersion reservoir $20$ and sufficiently dispersed by the stirrer $80$. At that time, the microcapsule concentration of the dispersion was 20%. Then, classification treatment was started by the pump $60$, and the pump flow rate was adjusted so that the ascent rate "V" of the dispersion in the barrel part $15$ (the ascent rate "V" is equal to the discharge rate of the dispersion from the discharging flow passage 40) became 2.98 mm/min.

The classification treatment was continued for 10 hours from the start of operation of the pump 60. During that time, sampling was periodically carried out from the sampling hole formed in the dispersion draining flow passage 40, and it was examined whether coarse microcapsules each having a particle diameter of 45 μm or greater were not contained therein with a digital microscope ("VHX-500" available from Keyence Corporation; 500-fold magnification). As a result, it was found that almost no coarse microcapsules each having a particle diameters of 45 μm or greater were contained and therefore classification treatment was carried out stably. The pump 60 was stopped at that time. The microcapsules remaining on the filter of the particle trapping part 50 were then collected to obtain 1,296 g of classified microcapsules (1-1) for electrophoretic display devices from which coarse microcapsules each having a particle diameter of 45 μm or greater were removed. The yield of the microcapsules was 81%. The results are shown in Table 1.

The particle size distribution of resultant classified microcapsules (1-1) for electrophoretic display devices was measured, and it was found that the volume-average particle diameter and coefficient of variation (CV value) thereof were 37 μm and 22%, respectively. The results are shown in Table 1.

<Classification Treatment to Remove Fine Microcapsules>

Using the same particle classification apparatus as described above, under the condition for removing fine microcapsules each having a particle diameter of 32 μm or smaller, specifically, under the condition of adjusting the pump flow rate so that the ascent rate "V" of the dispersion in the barrel part 15 (the ascent rate "V" is equal to the discharge rate of the dispersion from the discharging flow passage 40) became 7.08 mm/min, classification treatment was carried out with respect to 1,296 g of classified microcapsules (1-1) for electrophoretic display devices in the same manner as described above. In this Example, the second particle diameter was set to be 32 μm. (In the Stokes equation (2), as the density $\rho_p$ of the particles, there was used the density calculated from the components contained in the dispersion for electrophoretic display devices, having electrophoretic particle concentrations of 3% for titanium black and 35% for titanium dioxide, which was obtained in Preparation Example 2.)

The classification treatment was continued for 5 hours from the start of operation of the pump 60. During that time, sampling was periodically carried out from the sampling hole formed in the dispersion draining flow passage 40, and it was examined whether fine microcapsules each having a particle diameter of 32 μm or smaller were not contained therein with a digital microscope ("VHX-500" available from Keyence Corporation; 500-fold magnification). As a result, it was found that almost no fine microcapsules having a particle diameter of 32 μm or smaller were contained and therefore classification treatment was carried out stably. The pump 60 was stopped at that time. The dispersion in the system was then completely collected in the dispersion reservoir 20, and water was removed from the collected dispersion to obtain 752 g of classified microcapsules (1-2) for electrophoretic display devices from which fine microcapsules each having a particle diameter of 32 μm or smaller were removed. The yield of the microcapsules was 47%. The results are shown in Table 1.

The particle size distribution of resultant classified microcapsules (1-2) for electrophoretic display devices was measured, and it was found that the volume-average particle diameter and coefficient of variation (CV value) thereof were 41 μm and 12%, respectively. The results are shown in Table 1.

Example 2

<Preparation of Microcapsules>

A 500-mL flat-bottom separable flask was charged with 60 g of water, 6 g of gum arabic, and 6 g of gelatin, and the mixture was dissolved to obtain an aqueous gelatin-gum arabic solution. While the aqueous solution was kept at 43° C., 100 g of the dispersion for electrophoretic display devices heated at 50° C. was added under stirring at 350 rpm using a disper ("T.K. ROBOMICS" available from PRIMIX Corporation). After that, the stirring speed was changed to 1,600 rpm, and stirring was carried out for 2 minutes. Then, the stirring speed was changed to 1,000 rpm, and 300 mL of warm water at 43° C. was added to obtain a suspension. The stirring was changed to stirring by paddle blades, a thermometer and a pH meter were set, and the temperature was kept at 40° C. while the entire content was stirred.

Then, a 10% aqueous acetic acid solution was gradually added dropwise to adjust pH to 4.3. After the gelatin-gum arabic precipitation and microcapsule formation were confirmed with a digital microscope ("VHX-500" available from Keyence Corporation; 500-fold magnification), the mixture was cooled to 10° C. Thus, in this Example, there were prepared microcapsules each enclosing a dispersion containing electrophoretic particles and a solvent in a shell made of gelatin and gum arabic.

After the mixture was kept for 30 minutes in the cooled state, 3 mL of a 37% aqueous formalin solution was added and a 10% aqueous sodium carbonate solution was gradually added dropwise to adjust pH to 8.8. After that, the mixture was heated to 30° C. and kept for 2 hours. After aging was carried out at 40° C. for 1 hour, the mixture was cooled to 25° C. and filtered with a standard sieve having meshes of 53 μm to remove coarse microcapsules each having a particle diameter of 53 μm or greater. Then, the microcapsule dispersion was put in a 2-L beaker, and water was added to adjust the entire amount to be 1,000 mL. The dispersion was kept still to precipitate the microcapsules, and the supernatant solution was discarded. This operation was repeated three times to wash the microcapsules.

Thus, microcapsules (2-0) for electrophoretic display devices were obtained. The particle side distribution of microcapsules (2-0) for electrophoretic display devices was measured, and the volume average particle diameter and coefficient of variation (CV value) thereof were 42 μm and 31%, respectively. The results are shown in Table 1.

<Classification Treatment to Remove Coarse Microcapsules>

Classification treatment was carried out in the same manner as described in the classification treatment to remove coarse microcapsules in Example 1, except that 1,500 g of microcapsules (2-0) for electrophoretic display devices were used instead of microcapsules (1-0) for electrophoretic display devices in the classification treatment to remove coarse microcapsules in Example 1. In this Example, the first particle diameter was set to be 45 μm. (In the Stokes equation (2), as the density $\rho_p$ of the particles, there was used the density calculated from the components contained in the dispersion for electrophoretic display devices, having electrophoretic particle concentrations of 3% for titanium black and 35% for titanium dioxide, which was obtained in Preparation Example 2.)

The classification treatment was continued for 10 hours from the start of operation of the pump 60. During that time, sampling was periodically carried out from the sampling hole formed in the dispersion draining flow passage 40, and it was examined whether coarse microcapsules each having a particle diameter of 45 μm or greater were not contained therein with a digital microscope ("VHX-500" available from Keyence Corporation; 500-fold magnification). As a result, it was found that almost no coarse microcapsules each having a particle diameters of 45 μm or greater were contained and therefore classification treatment was carried out stably. The pump 60 was stopped at that time. The microcapsules remaining on the filter of the particle trapping part 50 were then collected to obtain 1,185 g of classified microcapsules (2-1) for electrophoretic display devices from which coarse microcapsules each having a particle diameter of 45 μm or greater were removed. The yield of the microcapsules was 79%. The results are shown in Table 1.

The particle size distribution of resultant classified microcapsules (2-1) for electrophoretic display devices was measured, and it was found that the volume-average particle diameter and coefficient of variation (CV value) thereof were 37 μm and 25%, respectively. The results are shown in Table 1.

<Classification Treatment to Remove Fine Microcapsules>

Classification treatment was carried out in the same manner as described in the classification treatment to remove fine microcapsules in Example 1, except that 1,185 g of classified microcapsules (2-1) for electrophoretic display devices were used instead of classified microcapsules (1-1) for electrophoretic display devices in the classification treatment to remove fine microcapsules in Example 1. In this Example, the second particle diameter was set to be 32 μm. (In the Stokes equation (2), as the density $\rho_p$ of the particles, there was used the density calculated from the components contained in the dispersion for electrophoretic display devices, having electrophoretic particle concentrations of 3% for titanium black and 35% for titanium dioxide, which was obtained in Preparation Example 2.)

The classification treatment was continued for 7 hours from the start of operation of the pump 60. During that time, sampling was periodically carried out from the sampling hole formed in the dispersion draining flow passage 40, and it was examined whether fine microcapsules each having a particle diameter of 32 μm or smaller were not contained therein with a digital microscope ("VHX-500" available from Keyence Corporation; 500-fold magnification). As a result, it was found that almost no fine microcapsules each having a particle diameters of 32 μm or smaller were contained and therefore classification treatment was carried out stably. The pump 60 was stopped at that time. The dispersion in the system was then completely collected in the dispersion reservoir 20, and water was removed from the collected dispersion to obtain 630 g of classified microcapsules (2-2) for electrophoretic display devices from which fine microcapsules each having a particle diameter of 32 μm or smaller were removed. The yield of the microcapsules was 42%. The results are shown in Table 1.

The particle size distribution of resultant classified microcapsules (2-2) for electrophoretic display devices was measured, and it was found that the volume-average particle diameter and coefficient of variation (CV value) thereof were 41 μm and 14%, respectively. The results are shown in Table 1.

Comparative Example 1

<Preparation of Microcapsules>

In this Comparative Example, there were used microcapsules (1-0) for electrophoretic display devices, which had been prepared in Example 1. The microcapsules are defined as microcapsules (C1-0) for electrophoretic display devices.

<Classification Treatment to Remove Coarse Microcapsules>

First, 1,000 g of an aqueous dispersion containing 50 g of microcapsules (C1-0) for electrophoretic display devices were allowed once to pass through a standard sieve having meshes of 45 μm. The microcapsules remaining on the standard sieve were collected, and 1 L of deionized water was added thereto. The microcapsules were sufficiently dispersed therein, and the resultant dispersion was then allowed once to pass through a standard sieve having meshes of 45 μm. The dispersions having passed through the standard sieve were mixed together, and water was removed therefrom to obtain 37 g of classified microcapsules (C1-1) for electrophoretic display devices. The yield of the microcapsules was 74%. The results are shown in Table 1.

The classified microcapsules (C1-1) for electrophoretic display devices were observed with a digital microscope ("VHX-500" available from Keyence Corporation; 500-fold magnification), and it was found that a few coarse microcapsules each having a particle diameter of 45 μm or greater were contained. Further, the microcapsules remaining on the standard sieve were observed with a digital microscope ("VHX-500" available from Keyence Corporation; 500-fold magnification), and it was found that a few microcapsules each having a particle diameter of 45 μm or smaller were contained.

The particle size distribution of resultant classified microcapsules (C1-1) for electrophoretic display devices was measured, and it was found that the volume-average particle diameter and coefficient of variation (CV value) thereof were 36 μm and 24%, respectively. The results are shown in Table 1.

<Classification Treatment to Remove Fine Microcapsules>

First, 800 g of an aqueous dispersion containing 37 g of microcapsules (C1-1) for electrophoretic display devices were allowed once to pass through a standard sieve having meshes of 32 μm. The microcapsules remaining on the standard sieve were collected, and 1 L of deionized water was added thereto. The microcapsules were sufficiently dispersed therein, and the resultant dispersion was then allowed once to pass through a standard sieve having meshes of 32 μm. The microcapsules remaining on the standard sieve were mixed together to obtain 20 g of classified microcapsules (C1-2) for electrophoretic display devices. The yield of the microcapsules was 40%. The results are shown in Table 1.

The particle size distribution of resultant classified microcapsules (C1-2) for electrophoretic display devices was measured, and it was found that the volume-average particle diameter and coefficient of variation (CV value) thereof were 39 μm and 15%, respectively. The results are shown in Table 1.

Comparative Example 2

<Preparation of Microcapsules>

In this Comparative Example, there were used microcapsules (2-0) for electrophoretic display devices, which had been prepared in Example 2. The microcapsules are defined as microcapsules (C2-0) for electrophoretic display devices.

<Classification Treatment to Remove Coarse Microcapsules>

First, 1,000 g of an aqueous dispersion containing 50 g of microcapsules (C2-0) for electrophoretic display devices were allowed once to pass through a standard sieve having meshes of 45 μm. The microcapsules remaining on the standard sieve were collected, and 1 L of deionized water was added thereto. The microcapsules were sufficiently dispersed therein, and the resultant dispersion was then allowed once to pass through a standard sieve having meshes of 45 μm. The dispersions having passed through the standard sieve were mixed together, and water was removed therefrom to obtain 44 g of classified microcapsules (C2-1) for electrophoretic display devices. The yield of the microcapsules was 88%. The results are shown in Table 1.

The classified microcapsules (C2-1) for electrophoretic display devices were observed with a digital microscope ("VHX-500" available from Keyence Corporation; 500-fold magnification), and it was found that a great number of coarse microcapsules each having a particle diameter of 45 μm or greater were contained.

The particle size distribution of resultant classified microcapsules (C2-1) for electrophoretic display devices was measured, and it was found that the volume-average particle diameter and coefficient of variation (CV value) thereof were 41 μm and 28%, respectively. The results are shown in Table 1.

<Classification Treatment to Remove Fine Microcapsules>

First, 900 g of an aqueous dispersion containing 44 g of microcapsules (C2-1) for electrophoretic display devices were allowed once to pass through a standard sieve having meshes of 32 μm. The microcapsules remaining on the standard sieve were collected, and 1 L of deionized water was added thereto. The microcapsules were sufficiently dispersed therein, and the resultant dispersion was then allowed once to pass through a standard sieve having meshes of 32 μm. The microcapsules remaining on the standard sieve were mixed together to obtain 15.5 g of classified microcapsules (C2-2) for electrophoretic display devices. The yield of the microcapsules was 31%. The results are shown in Table 1.

The particle size distribution of resultant classified microcapsules (C2-2) for electrophoretic display devices was measured, and it was found that the volume-average particle diameter and coefficient of variation (CV value) thereof were 43 μm and 22%, respectively. The results are shown in Table 1.

Test Example 1

Using microcapsules (1-0) for electrophoretic display devices, which was obtained in Example 1, classified microcapsules (1-2) for electrophoretic display devices, which was obtained in Example 1, microcapsules (2-0) for electrophoretic display devices, which was obtained in Example 2, classified microcapsules (2-2) for electrophoretic display devices, which was obtained in Example 2, microcapsules (C1-0) for electrophoretic display devices, which was obtained in Comparative Example 1, classified microcapsules (C1-2) for electrophoretic display devices, which was obtained in Comparative Example 1, microcapsules (C2-0) for electrophoretic display devices, which was obtained in Comparative Example 2, and classified microcapsules (C2-2) for electrophoretic display devices, which was obtained in Comparative Example 2, the following test was carried out.

To 30 g of an aqueous paste containing 18 g of the microcapsules, there was added 6 g of a resin solution with a solid content of 50%, which had been obtained by dissolving an alkali-soluble resin ("WR301A" available from Nippon Shokubai Co., Ltd.) in ammonia, followed by mixing with a rotation-and-revolution mixer ("Awatori Rentaro AR-100" available from Thinky Corporation) for 10 minutes, to obtain a coating solution.

This coating solution was applied to a PET film with an ITO electrode formed on a base material having a thickness of 125 μm ("Highbeam CF98" available from Toray Industries, Inc.) with an applicator, while an uncoated part (i.e., an electrically conductive part) was left at least on one side thereof, so that the coating thickness after drying became about 40 μm, followed by drying at 90° C. for 10 minutes, to obtain a sheet for electrophoretic display devices.

From this sheet for electrophoretic display devices, a coated part having a length of 5 cm and a width of 3 cm was cut in a state where an uncoated part was left on one side thereof, and as an opposite electrode, a PET film with an ITO electrode formed on a base material having a thickness of 75 μm ("Highbeam CF98" available from Toray Industries, Inc.), which film had a length of 6 cm and a width of 4 cm, was attached thereto (at that time, their arbitrary two points were fixed with a cellophane tape), and the attached sheet and film was placed on a glass plate having a thickness of 2 mm so that a lamination side became an upper roll side, and was laminated by allowing them to pass between two rolls (with a clearance of 0 mm) for lamination to obtain an electrophoretic display device. In the lamination, the upper roll (which had a roll diameter of 3 inches (i.e., about 7.62 cm), was made of silicone rubber, was heated with a heating medium, was driven to rotate at a feed rate of 6 cm/min., and was pressed to the lower roll by air pressure) was heated at 70° C., and the pressure (i.e., lamination pressure) of pressing the upper roll to the lower roll (which had a roll diameter of 3 inches (i.e., about 7.62 cm), was made of silicone rubber, was not heated, was able to freely rotate, and had a fixed roll position) was set to be 0.4 MPa.

The resultant electrophoretic display device was measured for reflectance of white display and contrast, and was evaluated for display device. The results are shown in Table 1.

TABLE 1

| | Microcapsules No. | Particle diameter (μm) | CV value (%) | Yield (%) | Reflectance of white display (%) | Contrast | Number of defective microcapsules (capsules) |
|---|---|---|---|---|---|---|---|
| Example 1 | 1-0 | 40 | 28 | 100 | 32 | 5.3 | 0 |
| | 1-1 | 37 | 22 | 81 | — | — | — |
| | 1-2 | 41 | 12 | 47 | 45 | 10.2 | 0 |
| Example 2 | 2-0 | 42 | 31 | 100 | 33 | 5.9 | 1 |
| | 2-1 | 37 | 25 | 79 | — | — | — |
| | 2-2 | 41 | 14 | 42 | 42 | 8.9 | 1 |

TABLE 1-continued

|  | Microcapsules No. | Particle diameter (μm) | CV value (%) | Yield (%) | Reflectance of white display (%) | Contrast | Number of defective microcapsules (capsules) |
|---|---|---|---|---|---|---|---|
| Comparative Example 1 | C1-0 | 40 | 28 | 100 | 32 | 5.3 | 0 |
|  | C1-1 | 36 | 24 | 74 | — | — | — |
|  | C1-2 | 39 | 15 | 40 | 42 | 7.0 | 8 |
| Comparative Example 2 | C2-0 | 42 | 31 | 100 | 33 | 5.9 | 1 |
|  | C2-1 | 41 | 28 | 88 | — | — | — |
|  | C2-2 | 43 | 22 | 31 | 35 | 6.2 | 12 |

As can be seen from Table 1, the microcapsules for electrophoretic display, which had been classified using a specific particle classification apparatus in Examples 1 and 2, had small coefficients of variation (CV values) of particle diameter and had high yields. In addition, the electrophoretic display devices, which were produced using these microcapsules for electrophoretic display devices, had high reflectance of white display and high contrast and had very small numbers of defective microcapsules.

In contrast, the microcapsules for electrophoretic display devices, which were classified using a standard sieve in Comparative Examples 1 and 2, had large coefficients of variation (CV value) of particle diameter and had low yields. In addition, the electrophoretic display devices, which were produced using these microcapsules for electrophoretic display devices, had low reflectance of white display and low contrast and had very great numbers of defective microcapsules.

Thus, the following advantageous effects of the present invention can be confirmed. That is, the use of a specific particle classification apparatus makes it possible to carry out the classification of microcapsules for electrophoretic display devices with high precision on an industrial scale without causing physical damages, not only for relatively hard microcapsules (e.g., microcapsules for electrophoretic display devices, each enclosing a dispersion containing electrophoretic particles and a solvent in a shell comprising an inner shell made of a mercapto-containing amino resin and an outer shell made of an epoxy resin) but also even for relatively soft microcapsules (e.g., microcapsules for electrophoretic display devices, each enclosing a dispersion containing electrophoretic particles and a solvent in a shell made of gelatin and gum arabic), and as a result, microcapsules for electrophoretic display devices, having a small coefficient of variation (CV value) of particle diameter, can be produced in a simple and easy manner at a high yield. In addition, the obtained microcapsules for electrophoretic display devices can be used, as their application, for sheets for electrophoretic display devices, and can provide electrophoretic display devices and electronic equipments, both of which can exhibit excellent display performance, such as reflectance of white display and contrast, and both of which can contain extremely few defective microcapsules.

The following will describe specific examples of electronic equipments each comprising a data displaying means, wherein the data displaying means comprises the electrophoretic display device of the present invention. In this connection, the electrophoretic display device of the present invention comprises a data displaying part, wherein the data displaying part comprises the sheet for electrophoretic display devices of the present invention, which sheet is produced using microcapsules for electrophoretic display devices, which microcapsules are obtained by the production process of the present invention.

Example 3

Figure 6:
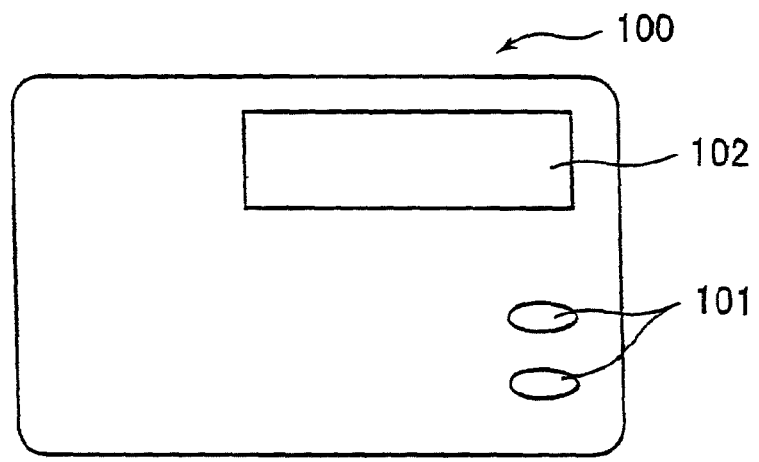
FIG. 6 is a plan view showing one example of an IC card which is one embodiment of the electronic equipment of the present invention.

FIG. 6 is a plan view showing one example of an IC card which is one embodiment of the electronic equipment of the present invention. IC card 100 has two operation buttons 110 and 110, and display panel 120. In the IC card 100, display panel 120 as a data displaying means is the electrophoretic display device of the present invention.

Example 4

Figure 7:
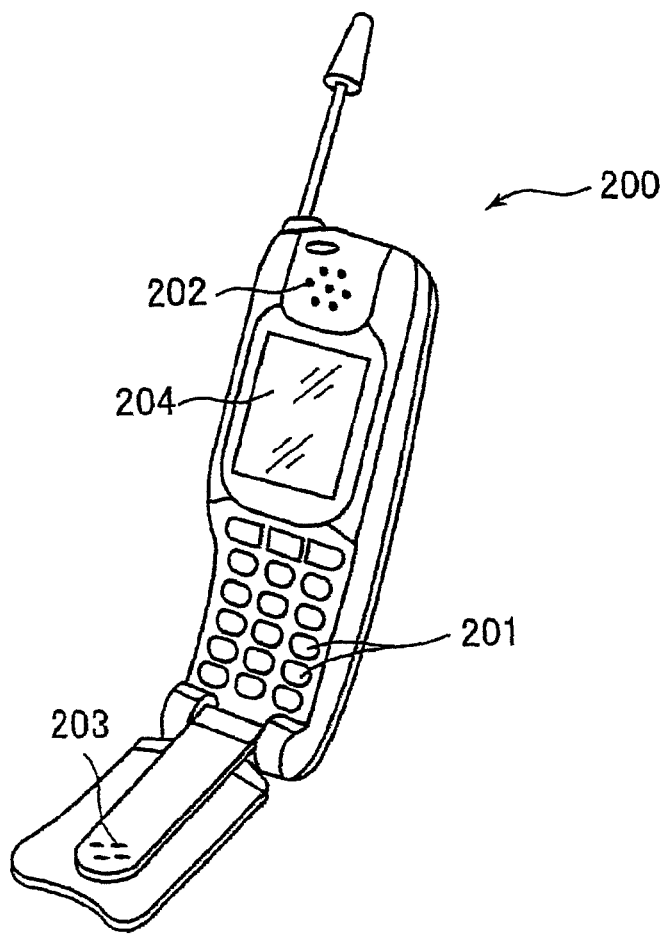
FIG. 7 is a perspective view showing one example of a mobile phone which is another embodiment of the electronic equipment of the present invention.

FIG. 7 is a perspective view showing one example of a mobile phone which is another embodiment of the electronic equipment of the present invention. Mobile phone 200 has two or more buttons 210, earpiece 220, mouthpiece 230, and display panel 240. In the mobile phone 200, display panel 240 as a data displaying means is the electrophoretic display device of the present invention.

Example 5

Figure 8:
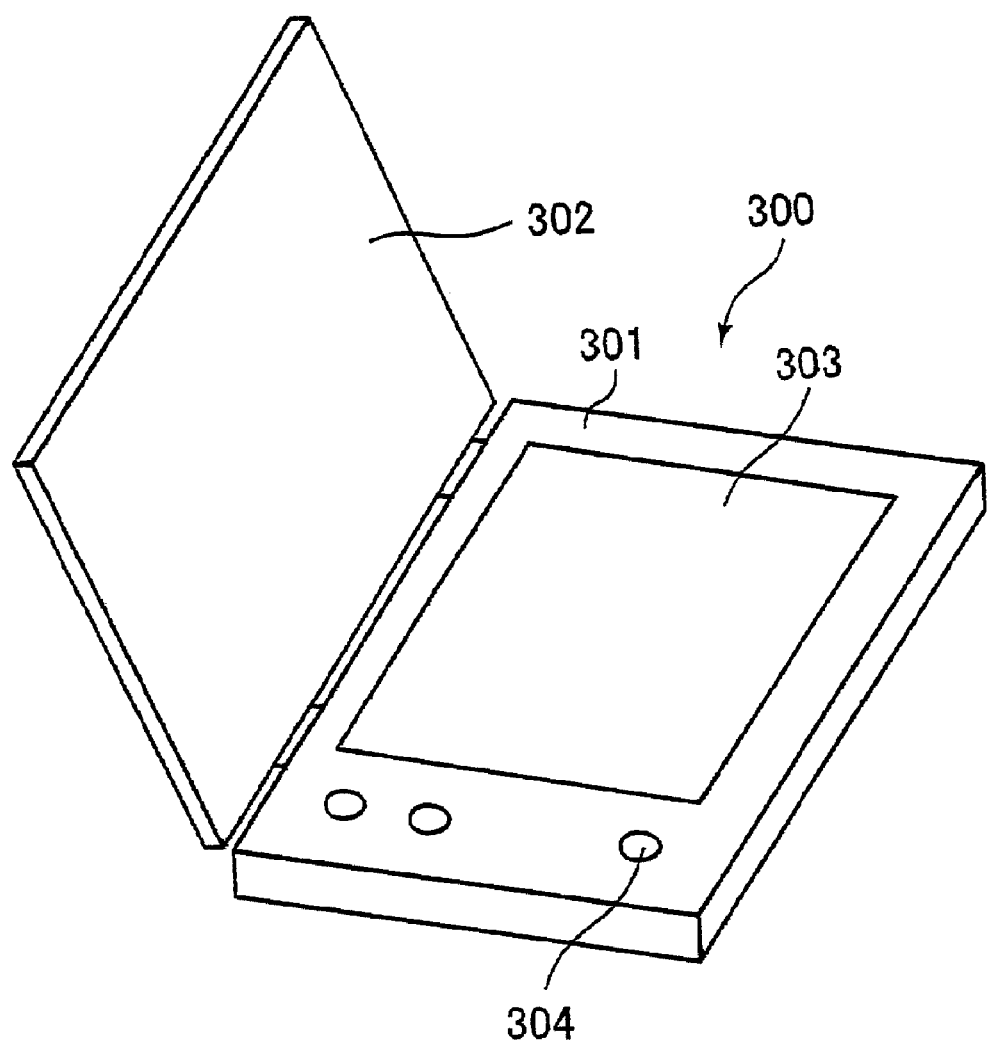
FIG. 8 is a perspective view showing one example of an electronic book which is still another embodiment of the electronic equipment of the present invention.

FIG. 8 is a perspective view showing one example of an electronic book which is still another embodiment of the electronic equipment of the present invention. Electronic book 300 has a book-shaped frame 310, and cover 320 which is provided rotatably relative to the frame 310 (openable and closable). Frame 310 has display device 330 in the state where the display surface is opened, and operating portion 340. In the electronic book 300, display device 330 as a data displaying means is the electrophoretic display device of the present invention.

Example 6

Figure 9:
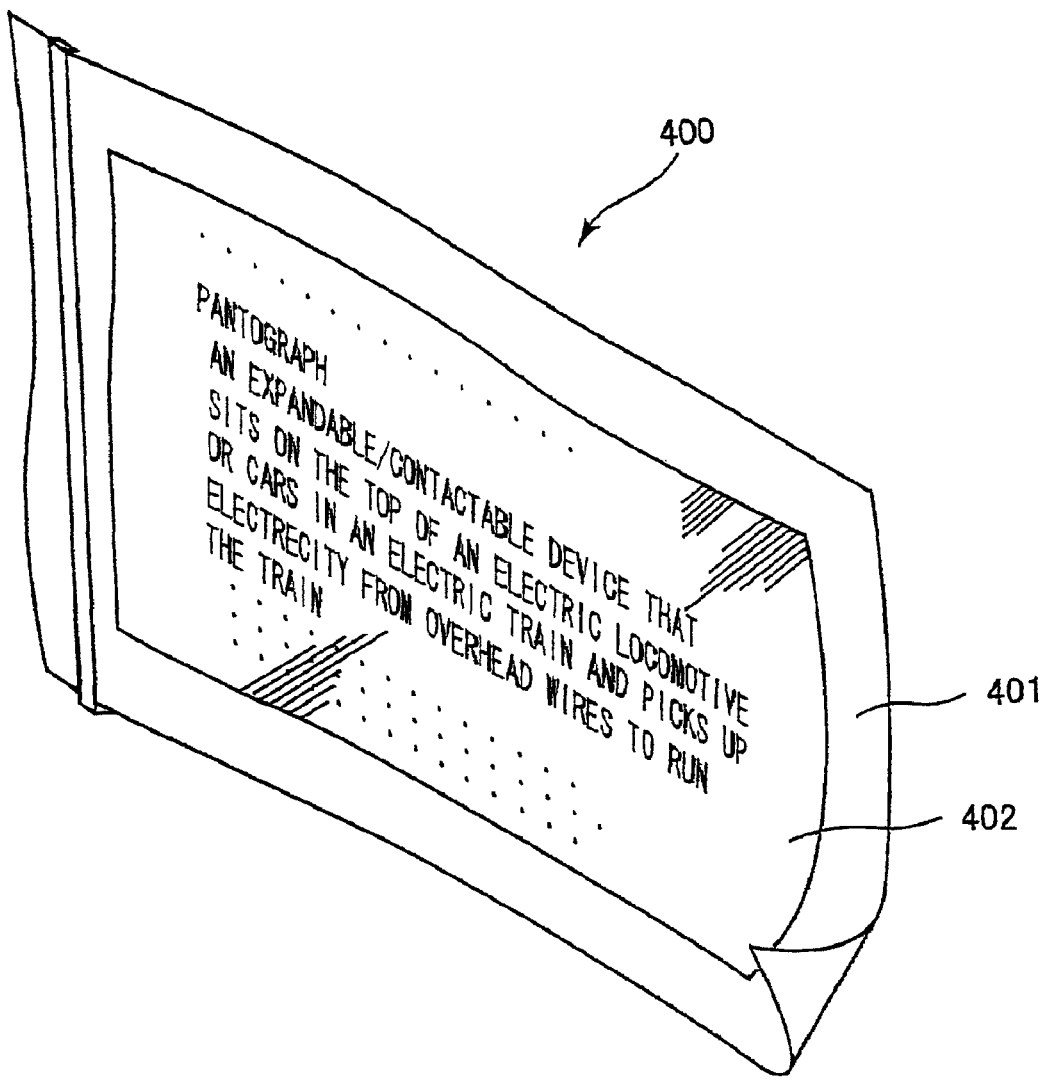
FIG. 9 is a perspective view showing one example of an electronic paper which is still another embodiment of the electronic equipment of the present invention.

FIG. 9 is a perspective view showing one example of an electronic paper which is still another embodiment of the electronic equipment of the present invention. Electronic paper 400 has body 410 formed of a re-writable sheet having the same texture and flexibility as those of a paper, and display unit 420. In the electronic paper 400, display unit 420 as a data displaying means is the electrophoretic display device of the present invention.

Each of the IC card of Example 3, the mobile phone of Example 4, the electronic book of Example 5, and the electronic paper of Example 6 comprises the electrophoretic display device of the present invention as the data displaying means, wherein the electrophoretic display device is composed of a sheet for electrophoretic display devices, which sheet was produced using microcapsules for electrophoretic display devices, which microcapsules were obtained by the production process of the present invention.

The invention claimed is:

1. A process for producing microcapsules for electrophoretic display devices, the process comprising:
classifying microcapsules for electrophoretic display devices from a dispersion containing microcapsules in an aqueous medium using a particle classification apparatus including a connecting flow passage toward a dispersion reservoir, a conical part, a barrel part, and a discharging flow passage, in this order from a bottom side of the particle classification apparatus,
wherein particles are classified from the dispersion contained in the dispersion reservoir by generating a circulating flow of the dispersion in the barrel part until the dispersion reaches the discharging flow passage from the connecting flow passage,
wherein the connecting flow passage includes a dispersion feeding flow passage for introducing the dispersion into the conical part and a dispersion draining flow passage for returning the dispersion to the dispersion reservoir,
wherein at least a lower portion of the connecting flow passage is immersed from above the dispersion reservoir into the dispersion contained in the dispersion reservoir,
wherein a classifying section formed by the conical part and the barrel part is located outside and above the dispersion reservoir, and
wherein the particle classification apparatus further includes a particle trapping part for trapping particles from the dispersion flowing out of the classifying section through the discharging flow passage.

2. The process according to claim 1, wherein:
(i) each of the microcapsules for electrophoretic display devices, having a particle diameter not smaller than a first particle diameter are removed by classification using the particle classification apparatus, and then each of the remaining microcapsules for electrophoretic display devices having a particle diameter not greater than a second particle diameter, which is smaller than the first particle diameter, are removed by classification using the particle classification apparatus; or
(ii) each of the microcapsules for electrophoretic display devices having a particle diameter not greater than the second particle diameter are removed by classification using the particle classification apparatus, and then each of the remaining microcapsules for electrophoretic display devices having a particle diameter not smaller than the first particle diameter, which is greater than the second particle diameter, are removed by classification using the particle classification apparatus.

3. The process according to claim 2, wherein the coefficient of variation (CV value) of particle diameter of the finally obtained microcapsules for electrophoretic display devices is not higher than 14%.

4. Microcapsules for electrophoretic display devices, which are obtained by a process according to claim 1.

5. A sheet for electrophoretic display devices, comprising a layer containing microcapsules for electrophoretic display devices according to claim 4 and a binder resin.

6. The sheet according to claim 5, wherein the layer containing the microcapsules for electrophoretic display devices and the binder resin is formed on an electrically conductive film.

7. An electrophoretic display device comprising a data displaying part, wherein the data displaying part has a sheet for electrophoretic display devices according to claim 5.

8. An electronic equipment comprising a data displaying means, wherein the data displaying means has an electrophoretic display device according to claim 7.

* * * * *